(12) United States Patent
Pasquali et al.

(10) Patent No.: US 12,149,611 B2
(45) Date of Patent: Nov. 19, 2024

(54) MULTICAST ENCRYPTION SCHEME FOR DATA-OWNERSHIP PLATFORM

(71) Applicant: Ecosteer Srl, Bolzano (IT)

(72) Inventors: Elena Pasquali, Bolzano (IT); Daniele Grazioli, Bolzano (IT)

(73) Assignee: Ecosteer Srl (IT)

( * ) Notice: Subject to any disclaimer, the term of this patent is extended or adjusted under 35 U.S.C. 154(b) by 612 days.

(21) Appl. No.: 17/012,689

(22) Filed: Sep. 4, 2020

(65) Prior Publication Data

US 2021/0344484 A1 Nov. 4, 2021

Related U.S. Application Data

(63) Continuation of application No. 16/861,760, filed on Apr. 29, 2020, now Pat. No. 10,771,243.

(51) Int. Cl.
| | |
|---|---|
| H04L 9/08 | (2006.01) |
| H04L 9/14 | (2006.01) |
| H04L 9/32 | (2006.01) |

(52) U.S. Cl.
CPC .......... *H04L 9/0819* (2013.01); *H04L 9/0861* (2013.01); *H04L 9/0891* (2013.01); *H04L 9/14* (2013.01); *H04L 9/3213* (2013.01)

(58) Field of Classification Search
CPC ... H04L 9/0819; H04L 9/0861; H04L 9/0891; H04L 9/14; H04L 9/3213; H04L 9/083;
(Continued)

(56) References Cited

U.S. PATENT DOCUMENTS

| | | | |
|---|---|---|---|
| 5,748,736 A | 5/1998 | Mittra | |
| 7,376,652 B2 | 5/2008 | Hayes-Roth | |

(Continued)

FOREIGN PATENT DOCUMENTS

| | | |
|---|---|---|
| CN | 108683705 A | 10/2018 |
| CN | 108964911 A | 12/2018 |

(Continued)

OTHER PUBLICATIONS

Shafagh et al., "Droplet: Decentralized Authorization for IoT Data Streams," ArXiv:1806.02057v1, Jun. 6, 2018, https://arxiv.org/pdf/1806.02057.pdf (16 pages).

(Continued)

*Primary Examiner* — Mohammad W Reza
(74) *Attorney, Agent, or Firm* — Sterne, Kessler, Goldstein & Fox P.L.L.C.

(57) ABSTRACT

Disclosed herein are embodiments for implementing periodic management of cryptographic keys. An embodiment includes a processor configured to perform operations comprising receive a first input associating a first set of subscribers with a first data stream published by the first publisher device, and a first cryptographic key. Processor may transmit, to the first publisher device, a first confirmation, indicating that the first cryptographic key is ready for use, for example. In some embodiments, processor may release the first cryptographic key to a first set of subscribers, receive a second input from a publishing user, associating a different, second set of subscribers with the first data stream, and receive a second cryptographic key after a certain time period. Processor may further transmit, to the first device, a second confirmation, indicating that the second cryptographic key is ready for use, and release the second cryptographic key to the second set of subscribers.

18 Claims, 55 Drawing Sheets

(58) Field of Classification Search
CPC ....... H04L 9/50; H04L 63/062; H04L 63/068; H04L 65/1045; H04L 65/611; H04L 65/80; H04L 67/12; H04L 67/53; H04L 67/55; H04L 67/562; H04L 2209/60; H04L 2209/76; H04L 9/3239
See application file for complete search history.

(56) References Cited

U.S. PATENT DOCUMENTS

| | | | |
|---|---|---|---|
| 8,625,803 | B1 | 1/2014 | Radhakrishnan et al. |
| 10,491,378 | B2 | 11/2019 | Binning et al. |
| 10,771,243 | B1 | 9/2020 | Pasquali et al. |
| 2010/0211782 | A1 | 8/2010 | Auradkar et al. |
| 2016/0241389 | A1* | 8/2016 | Le Saint ............... H04L 9/0844 |
| 2017/0116693 | A1 | 4/2017 | Rae et al. |
| 2017/0134161 | A1 | 5/2017 | Goeringer et al. |
| 2018/0039942 | A1 | 2/2018 | Rogers et al. |
| 2018/0139042 | A1 | 5/2018 | Binning et al. |
| 2018/0254892 | A1 | 9/2018 | Egorov et al. |
| 2019/0149633 | A1 | 5/2019 | Evans et al. |
| 2019/0207759 | A1 | 7/2019 | Chan et al. |
| 2019/0268336 | A1 | 8/2019 | Gomi et al. |
| 2019/0340368 | A1 | 11/2019 | Eidson et al. |
| 2020/0059460 | A1* | 2/2020 | Orr ....................... H04W 12/04 |
| 2021/0400474 | A1* | 12/2021 | Stauffer ................ H04L 9/0825 |
| 2022/0051778 | A1* | 2/2022 | Kühni ..................... G06N 3/08 |

FOREIGN PATENT DOCUMENTS

| | | | | |
|---|---|---|---|---|
| CN | 109547818 | A | 3/2019 | |
| EP | 2985969 | A1 * | 2/2016 | ........... G06F 21/335 |
| EP | 3512228 | A1 | 7/2019 | |
| JP | 2004302846 | A | 10/2004 | |
| WO | WO 2016/200595 | A1 | 12/2016 | |
| WO | WO 2018/154489 | A1 | 8/2018 | |
| WO | WO 2019/002671 | A1 | 1/2019 | |

OTHER PUBLICATIONS

Ocean Protocol Foundation Ltd., "Ocean Protocol: A Decentralized Substrate for AI Data & Services Technical Whitepaper," Apr. 15, 2019, https://oceanprotocol.com/tech-whitepaper.pdf (59 pages).

Streamspace, "StreamSpace Business Plan / White Paper," Version 8.1, Sep. 25, 2018 (41 pages).

Office Action dated Oct. 13, 2021, in Japanese Patent Application 2021-074831, filed Apr. 27, 2021, 6 pages (+English translation, 7 pages).

European Search Report from European Application No. 20204830.2, dated Mar. 19, 2021 (4 pages).

International Search Report and Written Opinion of the International Searching Authority directed to International Patent Application No. PCT/IB2021/053471, mailed Jul. 6, 2021; 13 pages.

* cited by examiner

Products  Add a product  7,864 tokens

← Back to the list

10 SUBSCRIBERS

| | USER | SUBSCRIPTION DATE | STATE | |
|---|---|---|---|---|
| ○ | ELECTRIC MOBILITY G | 10 JAN 2020 | ⊘ NOT GRANTED | GRANT ACCESS |
| ○ | CAR MAINTENANCE R | 03 JAN 2020 | ✓ GRANTED | REVOKE ACCESS |
| ○ | INSURANCE G | 09 DEC 2019 | ✓ GRANTED | REVOKE ACCESS |
| ○ | INSURANCE F | 09 DEC 2019 | ⊘ NOT GRANTED | GRANT ACCESS |
| ○ | HR MANAGEMENT C | 09 DEC 2019 | ⊘ NOT GRANTED | GRANT ACCESS |
| ○ | FLEET MANAGEMENT E | 06 DEC 2019 | ⊘ NOT GRANTED | GRANT ACCESS |
| ○ | INSURANCE E | 06 DEC 2019 | ✓ GRANTED | REVOKE ACCESS |
| ○ | INSURANCE D | 06 DEC 2019 | ✓ GRANTED | REVOKE ACCESS |

FIG. 5

Products Add a product  7,864 tokens

| USER | SUBSCRIPTION DATE | STATE | |
|---|---|---|---|
| ☐ ELECTRIC MOBILITY G | 10 JAN 2020 | ⊘ NOT GRANTED | [ GRANT ACCESS ] |
| ☐ CAR MAINTENANCE R | 03 JAN 2020 | ✓ GRANTED | [ REVOKE ACCESS ] |
| ☐ INSURANCE G | 09 DEC 2019 | ✓ GRANTED | [ REVOKE ACCESS ] |
| ☐ INSURANCE F | 09 DEC 2019 | ⊘ NOT GRANTED | [ GRANT ACCESS ] |
| ☐ HR MANAGEMENT C | 09 DEC 2019 | ⊘ NOT GRANTED | [ GRANT ACCESS ] |
| ☐ FLEET MANAGEMENT E | 06 DEC 2019 | ⊘ NOT GRANTED | [ GRANT ACCESS ] |
| ☐ INSURANCE E | 06 DEC 2019 | ✓ GRANTED | [ REVOKE ACCESS ] |
| ☐ INSURANCE D | 06 DEC 2019 | ✓ GRANTED | [ REVOKE ACCESS ] |
| ☐ TRAFFIC MANAGEMENT B | 02 DEC 2019 | ✓ GRANTED | [ REVOKE ACCESS ] |
| ☐ FLEET MANAGEMENT A | 02 DEC 2019 | ✓ GRANTED | [ REVOKE ACCESS ] |

FIG. 6

| Products | Add a product | | | |
|---|---|---|---|---|
| | USER | SUBSCRIPTION DATE | STATE | |
| ☐ | ELECTRIC MOBILITY G | 10 JAN 2020 | ✓ GRANTED | REVOKE ACCESS |
| ☐ | CAR MAINTENANCE R | 03 JAN 2020 | ✓ GRANTED | REVOKE ACCESS |
| ☐ | INSURANCE G | 09 DIC 2019 | ✓ GRANTED | REVOKE ACCESS |
| ☐ | INSURANCE F | 09 DIC 2019 | ⊘ NOT GRANTED | GRANT ACCESS |
| ☐ | HR MANAGEMENT C | 09 DIC 2019 | ⊘ NOT GRANTED | GRANT ACCESS |
| ☐ | FLEET MANAGEMENT E | 06 DIC 2019 | ⊘ NOT GRANTED | GRANT ACCESS |
| ☐ | INSURANCE E | 06 DIC 2019 | ✓ GRANTED | REVOKE ACCESS |
| ☐ | INSURANCE D | 06 DIC 2019 | ✓ GRANTED | REVOKE ACCESS |
| ☐ | TRAFFIC MANAGEMENT B | 02 DIC 2019 | ✓ GRANTED | REVOKE ACCESS |
| ☐ | FLEET MANAGEMENT A | 02 DIC 2019 | ✓ GRANTED | REVOKE ACCESS |

7,864 tokens

FIG. 7

Products Add a product  7,864 tokens

| USER | SUBSCRIPTION DATE | STATE | |
|---|---|---|---|
| ○ ELECTRIC MOBILITY G | 10 JAN 2020 | ✓ GRANTED | REVOKE ACCESS |
| ○ CAR MAINTENANCE R | 03 JAN 2020 | ⊘ NOT GRANTED | GRANT ACCESS |
| ○ INSURANCE G | 09 DIC 2019 | ✓ GRANTED | REVOKE ACCESS |
| ○ INSURANCE F | 09 DIC 2019 | ⊘ NOT GRANTED | GRANT ACCESS |
| ○ HR MANAGEMENT C | 09 DIC 2019 | ⊘ NOT GRANTED | GRANT ACCESS |
| ○ FLEET MANAGEMENT E | 06 DIC 2019 | ⊘ NOT GRANTED | GRANT ACCESS |
| ○ INSURANCE E | 06 DIC 2019 | ✓ GRANTED | REVOKE ACCESS |
| ○ INSURANCE D | 06 DIC 2019 | ✓ GRANTED | REVOKE ACCESS |
| ○ TRAFFIC MANAGEMENT B | 02 DIC 2019 | ✓ GRANTED | REVOKE ACCESS |
| ○ FLEET MANAGEMENT A | 02 DIC 2019 | ✓ GRANTED | REVOKE ACCESS |

FIG. 8

```
DEBUG [client] @MSG: 1546531354409 dangraz
DEBUG [client] @MSG: 1546531354911 dangraz
DEBUG [client] @MSG: 1546531355416 dangraz
DEBUG [client] @MSG: 1546531355920 dangraz
DEBUG [client] @MSG: 1546531356428 dangraz
DEBUG [client] @MSG: 1546531356928 dangraz
DEBUG [client] @MSG: 1546531357430 dangraz
DEBUG [client] @MSG: 1546531357941 dangraz
DEBUG [client] @MSG: 1546531358441 dangraz
DEBUG [client] @MSG: 1546531358948 dangraz
DEBUG [client] @MSG: 1546531359451 dangraz
DEBUG [client] @MSG: 1546531359956 dangraz
DEBUG [client] @MSG: 1546531360463 dangraz
DEBUG [client] @MSG: 1546531360966 dangraz
DEBUG [client] @MSG: 1546531361481 dangraz
DEBUG [client] @MSG: 1546531361981 dangraz
DEBUG [client] @MSG: 1546531362496 dangraz
DEBUG [client] @MSG: 1546531363011 dangraz
DEBUG [client] @MSG: 1546531363515 dangraz
DEBUG [client] @MSG: 1546531364021 dangraz
DEBUG [client] @MSG: 1546531364529 dangraz
DEBUG [client] @MSG: 1546531365033 dangraz
DEBUG [client] @MSG: 1546531365544 dangraz
DEBUG [client] @MSG: 1546531366051 dangraz
DEBUG [client] @MSG: 1546531366552 dangraz
DEBUG [client] @MSG: 1546531367053 dangraz
DEBUG [client] @MSG: 1546531367563 dangraz
DEBUG [client] @MSG: 1546531368070 dangraz
DEBUG [client] @MSG: 1546531368576 dangraz
```

FIG. 23

```
[10212] 2019/01/03 17:04:54.133432 [[33mTRC[0m] 127.0.0.1:49929 - cid:1 -->> MSG_PAYLOAD: [@DAT;787459;5b1d;BumHPWTcuIW/
JhxFCMsSzKvsYnk/yyMN;]

[10212] 2019/01/03 17:04:54.634427 [[33mTRC[0m] 127.0.0.1:49929 - cid:1 -->> [PUB DOP_TOPIC 50]
[10212] 2019/01/03 17:04:54.634427 [[33mTRC[0m] 127.0.0.1:49929 - cid:1 -->> MSG_PAYLOAD:
[@DAT;787459;2f07;BumHPWTcuIUeUjZgPooFHavsYnk/yyMn;]

[10212] 2019/01/03 17:04:55.134786 [[33mTRC[0m] 127.0.0.1:49929 - cid:1 -->> [PUB DOP_TOPIC 50]
[10212] 2019/01/03 17:04:55.134786 [[33mTRC[0m] 127.0.0.1:49929 - cid:1 -->> MSG_PAYLOAD:
[@DAT;787459;a8c6;BumHPWTcuIVzOusIYnMqavsYnk/yyMN;]

[10212] 2019/01/03 17:04:55.638959 [[33mTRC[0m] 127.0.0.1:49929 - cid:1 -->> [PUB DOP_TOPIC 50]
[10212] 2019/01/03 17:04:55.639957 [[33mTRC[0m] 127.0.0.1:49929 - cid:1 -->> MSG_PAYLOAD:
[@DAT;787459;dc89;BumHPWTcuIXV0EWwx61SsavsYnk/yyMn;]

[10212] 2019/01/03 17:04:56.141111 [[33mTRC[0m] 127.0.0.1:49929 - cid:1 -->> [PUB DOP_TOPIC 50]
[10212] 2019/01/03 17:04:56.142111 [[33mTRC[0m] 127.0.0.1:49929 - cid:1 -->> MSG_PAYLOAD:
[@DAT;787459;264c;BumHPWTcuIVua44E0IKha6vsYnk/yyMN;]

[10212] 2019/01/03 17:04:56.647031 [[33mTRC[0m] 127.0.0.1:49929 - cid:1 -->> [PUB DOP_TOPIC 50]
[10212] 2019/01/03 17:04:56.648021 [[33mTRC[0m] 127.0.0.1:49929 - cid:1 -->> MSG_PAYLOAD:
[@DAT;787459;6270;BumHPWTcuIXOWnYX0eRHYavsYnk/yyMN;]

[10212] 2019/01/03 17:04:57.149292 [[33mTRC[0m] 127.0.0.1:49929 - cid:1 -->> [PUB DOP_TOPIC 50]
[10212] 2019/01/03 17:04:57.149292 [[33mTRC[0m] 127.0.0.1:49929 - cid:1 -->> MSG_PAYLOAD:
[@DAT;787459;2506;BumHPWTcuIXToJgqEiUnVqvsYnk/yyMN;]

[10212] 2019/01/03 17:04:57.661685 [[33mTRC[0m] 127.0.0.1:49929 - cid:1 -->> [PUB DOP_TOPIC 50]
[10212] 2019/01/03 17:04:57.662688 [[33mTRC[0m] 127.0.0.1:49929 - cid:1 -->> MSG_PAYLOAD:
[@DAT;787459;5b0a;BumHPWTcuIVMgI4+fTX+uKvsYnk/yyMN;]

[10212] 2019/01/03 17:04:58.163076 [[33mTRC[0m] 127.0.0.1:49929 - cid:1 -->> [PUB DOP_TOPIC 50]
[10212] 2019/01/03 17:04:58.164078 [[33mTRC[0m] 127.0.0.1:49929 - cid:1 -->> MSG_PAYLOAD:
[@DAT;787459;cb10:BumHPWTcuIXy0qLnsfagoKvsYnk/yyMN;]
```

FIG. 24

```
DEBUG [KEYGET] idx:244198
DEBUG [KEYSET] idx:787459,len:48
DEBUG [KEYGET] idx:244198
DEBUG [KEYGET] idx:787459
DEBUG [KEYSET] idx:240690,len:48
DEBUG [KEYGET] idx:787459
DEBUG [KEYGET] idx:240690
DEBUG [KEYSET] idx:116683,len:48
```

FIG. 25

```
INFO [01-03]|17:05:57] Successfully sealed new block                         number=70379 hash=7df6b5...0de6d1
INFO [01-03]|17:05:57] 🏆 block reached canonical chain                       number=70374 hash=7142ea...75e232
INFO [01-03]|17:05:57] 🔨 mined potential block                               number=70379 hash=7df6b5...0de6d1
INFO [01-03]|17:05:57] Commit new mining work                                number=70380 txs=0 uncles=0 elapsed=997.6µs
INFO [01-03]|17:06:02] Successfully sealed new block                         number=70380 hash=e3d8cb...5e9461
INFO [01-03]|17:06:02] 🏆 block reached canonical chain                       number=70375 hash=e79a36...93c799
INFO [01-03]|17:06:02] 🔨 mined potential block                               number=70381 txs=0 uncles=0 elapsed=997.2µs
INFO [01-03]|17:06:02] Commit new mining work                                number=70380 hash=e3d8cb...5e9461
INFO [01-03]|17:06:07] Successfully sealed new block                         number=70381 hash=4a9e07...0c226e
INFO [01-03]|17:06:07] 🏆 block reached canonical chain                       number=70376 hash=01c8c5...3ddcc3
INFO [01-03]|17:06:07] 🔨 mined potential block                               number=70382 txs=0 uncles=0 elapsed=997.6µs
INFO [01-03]|17:06:07] Commit new mining work                                number=70381 hash=4a9e07...0c226e
INFO [01-03]|17:06:07] Submitted transaction                                 fullhash=0x239d6c07138d3ef33163471df85997b95b847881 3e075
6c999575147405cfco recient=0x31611BE40F69B50bbAAB243726F5bb723793C042
INFO [01-03]|17:06:12] Successfully sealed new block                         number=70382 hash=66a238...910d61
INFO [01-03]|17:06:12] 🏆 block reached canonical chain                       number=70377 hash=8bcd6e...9fc7ad
INFO [01-03]|17:06:12] 🔨 mined potential block                               number=70382 hash=66a238...910d61
INFO [01-03]|17:06:12] Commit new mining work                                number=70383 txs=1 uncles=0 elapsed=998µs
INFO [01-03]|17:06:17] Successfully sealed new block                         number=70378 hash=977716...1caaa4
INFO [01-03]|17:06:17] 🏆 block reached canonical chain                       number=70378 hash=539da2...bc838d
INFO [01-03]|17:06:17] 🔨 mined potential block                               number=70383 hash=977716...1caaa4
INFO [01-03]|17:06:17] Commit new mining work                                number=70384 txs=0 uncles=0 elapsed=996.1µs
INFO [01-03]|17:06:22] Successfully sealed new block                         number=70384 hash=0543c8...3dace1
INFO [01-03]|17:06:22] 🏆 block reached canonical chain                       number=70379 hash=7df6b5...0de6d1
INFO [01-03]|17:06:22] 🔨 mined potential block                               number=70384 hash=0543c8...3dace1
INFO [01-03]|17:06:22] Commit new mining work                                number=70385 txs=0 uncles=0 elapsed=998.3µs
```

FIG. 26

```
DEBUG [client] dedopify error(1)
DEBUG [client] BE19PQoSOZ+7r04lNTTbT+7t7d4xKFm8
DEBUG [client] dedopify error(1)
DEBUG [client] BE19PQoSOZ/A3ZUMkNX6ju7t7d4xKFm8
DEBUG [client] dedopify error(1)
DEBUG [client] BE19PQoSOZ91nGe2KZTu3e7t7d4xKFm8
DEBUG [client] dedopify error(1)
DEBUG [client] BE19PQoSOZ+sUueMuHdr107t7d4xKFm8
DEBUG [client] dedopify error(1)
DEBUG [client] BE19PQoSOZ+HIeMgoRm7207t7d4xKm8
DEBUG [client] dedopify error(1)
DEBUG [client] BE19PQoSOZ9UcNtoVtaH7+7t7d4xkm8
DEBUG [client] dedopify error(1)
DEBUG [client] BE19PQoSOZ8bwaf8WXhAN+7t7dxKFm8
DEBUG [client] dedopify error(1)
DEBUG [client] BE19PQoSOZ8YmqNI+EunJ07t7d4xKFm8
DEBUG [client] dedopify error(1)
DEBUG [client] BE19PQoSOZ+YXEPcG6q34+7t7d4xKFm8
DEBUG [client] dedopify error(1)
```

FIG. 27

```
> graz
"0x59c0fd4a1c6c175252abca4695a7f4c53c019fb2"
> ele
"0x050363c5f06f98a7b7258756d1e8a74e0dd21aed"
```

FIG. 28

```
> dop.address
"0x31611be40f69b50bbaab2437265bb7237793c042"
```

FIG. 29

Publisher Management Interface

Account (EOA): 0x050363C5F06F98A7B7258756d1e8a74e0dd21aed

Account Password: widget

Publisher Secret: mypassword

Product Address: 0x31611be40f69b50bbaab24372615bb723793c042

Subscription:

Granted: 0

Credit: 0

Debit: 0

SUBSCRIBERS
GRANT
BALANCE/STATUS
REVOKE
CHARGE

| Subscriber | Grant | Credit | Debit |
|---|---|---|---|

FIG. 30

Subscriber Management Interface

| Account (EOA): | 0x59c0fd4a1c6c175252abca4695a7f4c53c019fb2 |
|---|---|
| Account Password: | widget |
| Subscriber Secret: | widget |
| Product Address: | 0x31611be40f69b50bbaab243726f5bb723793c042 |
| Deposit Value: | 0 |

| Subscription: | Not Subscribed |
|---|---|
| Granted: | N/A |
| Credit: | N/A |
| Debit: | N/A |

SUBSCRIBE
DEPOSIT
BALANCE/STATUS
UNSUBSCRIBE

FIG. 31

Publisher Management Interface

Account (EOA): 0x050363C5F06F98A7B7258756d1e8a74e0dd21aed

Account Password: widget

Publisher Secret: mypassword

Product Address: 0x31611be40f69b50bbaab243726f5bb723793c042

Subscription: 0

SUBSCRIBERS
GRANT Granted: 0
BALANCE/STATUS Credit: 0
REVOKE Debit: 0
CHARGE

| Subscriber | | Grant | Credit | Debit |
|---|---|---|---|---|
| ☐ | 0x59c0fd4a1c6c175252abca4695a7f4o53c019fb2 | 1 | 5000000 | 0 |

FIG. 32

Subscriber Management Interface

Account (EOA): 0x59c0fd4a1c6c175252abca4695a7f4c53c019fb2
Account Password: widget
Subscriber Secret: widget
Product Address: 0x31611be40f69b50bbaab243726f5bb723793c042
Deposit Value: 5000000

Subscription: Valid
Granted: TRUE
Credit: 5000000
Debit: 0

SUBSCRIBE
DEPOSIT
BALANCE/STATUS
UNSUBSCRIBE

FIG. 33

```
DEBUG [client] @MSG: 1546532327330 dangraz
DEBUG [client] 6wakt/nYWX9LZGa5LMOHjm87aXuAKVCi
DEBUG [client] @MSG: 1546532327830 dangraz
DEBUG [client] 6wakt/nYWX897qLZ7vWJnW87aXuAkVCi
DEBUG [client] @MSG: 1546532328331 dangraz
DEBUG [client] 6wakt/nYWX+AjVUsS4FSzm87aXuAKVCi
DEBUG [client] @MSG: 1546532328841 dangraz
DEBUG [client] 6wakt/nYWX+oSpLm5isCN287aXuAKVCi
DEBUG [client] @MSG: 1546532329344 dangraz
DEBUG [client] 6wakt/nYWX8KuZyldLMefm87aXuAKVCi
DEBUG [client] @MSG: 1546532329858 dangraz
DEBUG [client] 6wakt/nYWX94UNPxhWqW2287aXuAKVCi
DEBUG [client] @MSG: 1546532330367 dangraz
DEBUG [client] 6wakt/nYWX+gYBOYwlv2fG87aXuAKVCi
DEBUG [client] @MSG: 1546532330877 dangraz
DEBUG [client] 6wakt/nYWX9sqQSppz8WVm87aXuAKVCi
DEBUG [client] @MSG: 1546532331386 dangraz
DEBUG [client] 6wakt/nYWX9zFfSep4DOHm87aXuAKVCi
DEBUG [client] @MSG: 1546532331892 dangraz
```

FIG. 34

MULTICAST ENCRYPTION SCHEME FOR DATA-OWNERSHIP PLATFORM

CROSS REFERENCE TO RELATED APPLICATIONS

This application is a continuation of U.S. patent application Ser. No. 16/861,760, filed Apr. 29, 2020, now issued as U.S. Pat. No. 10,771,243, which is incorporated by reference in its entirety.

BACKGROUND

In recent years, as computing technology and telemetry sensors have become more efficient, less costly, and more ubiquitous, there has been a proliferation of data generated by such new technology. Similar increases in data volume have been observed with other types of personal data, from social media to medical records. As data collected from individuals and their devices may become more personal and plentiful, such data may also seem to be less private, often being controlled by third parties who harvest personal data from many individuals to sell and trade this data. The third parties who control this data are thereby in a position to profit immensely, often without consideration or compensation for the individuals' privacy or control that the individuals relinquish for the sake of this monitoring. Given the control of third parties over conventional data collection, individuals rarely, if ever, have an opportunity to choose or consent to other specific third parties' access to their data.

In the current field, there are no known technologies capable of automating data processing for granting and withdrawing consent to access personal data. Some existing blockchain providers have looked into deploying other types of technical privacy overlays. For example, Enigma (enigma.co) focuses on the protection of data sets within the blockchain. As another example, Ocean Protocol is a project that aims at developing a protocol and network—a tokenized ecosystem—to incentivize sharing data and services, such as for AI-related applications. However, these existing systems each have considerable drawbacks. For example, both Enigma and Ocean Protocol need data repositories with massive storage requirements for certain use cases—these are not scalable solutions. Additionally, Enigma and Ocean Protocol must propagate data to their persistence providers before carrying out their tokenization and access control, creating a potential security vulnerability. Enigma and Ocean Protocol also both bring their own data access layers into the mix, adding further complexity over existing communication protocols. A different approach thus becomes necessary to have a scalable solution, compliant with privacy regulations, to restore control to individuals.

BRIEF DESCRIPTION OF THE DRAWINGS

The accompanying drawings are incorporated herein and form a part of the specification.

FIG. 5 depicts an example publisher view of subscribers for a particular data stream, according to some embodiments.

FIG. 6 depicts an example scrolled publisher view of subscribers for a particular data stream, according to some embodiments.

FIG. 7 depicts an example publisher action revoking access of a selected subscriber for the particular data stream, according to some embodiments.

FIG. 8 depicts an example result of the publisher action of FIG. 7, having revoked access of the selected subscriber for the particular data stream, according to some embodiments.

FIG. 23 depicts an example console of a data-stream publisher, according to some embodiments.

FIG. 24 depicts an example that shows encrypted data sent by the publisher to the broker. Data may be encrypted prior to being sent to the broker, according to some embodiments.

FIG. 25 depicts an example log of a proxy server, according to some embodiments.

FIG. 26 depicts an example log of an Ethereum node that may be used to execute a smart contract associated with a referenced data stream, according to some embodiments.

FIG. 27 depicts an example console executing the program implementing a subscriber, according to some embodiments.

FIG. 28 depicts an example Ethereum console with two externally owned accounts (EOAs), according to some embodiments.

FIG. 29 depicts an example Ethereum console showing an address of the smart contract associated with the data stream, according to some embodiments.

FIG. 30 depicts an example screenshot of a publisher front-end, according to some embodiments.

FIG. 31 depicts an example screenshot of a subscriber front-end, according to some embodiments.

FIG. 32 depicts an example front-end interface for a publisher with a subscriber listed, according to some embodiments.

FIG. 33 depicts an example screenshot showing a corresponding subscriber status in the subscriber's front-end, according to some embodiments.

FIG. 34 depicts output of an example console executing an implementation of provider for the subscriber, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer-program product (non-transitory computer-readable storage medium or device) embodiments, and/or combinations and sub-combinations thereof, for implementing multicast encryption for a data-ownership platform.

According to the enhanced techniques disclosed herein, aspects of the present disclosure includes one or more apparatus or systems to control access to data streams and data points in a given data stream, without requiring direct interaction between a subscriber and a publisher (the originator of the data stream), nor with an optional broker or network infrastructure transporting the data.

As one example, a vehicle owner or driver may decide who are the subscribers that have access to any data points that may be generated by a telematics box on-board the vehicle, without reconfiguring, changing the status of, or otherwise even communicating with the telematics box, in an embodiment. For instance, the owner or driver of the vehicle may revoke access to one or more of the previously granted subscribers without changing the status, reconfiguring, or communicating with the telematics box. Also, any grant operations and/or revoke operations may not require any change in status, reconfiguration, or communication with the broker or network infrastructure that may be transporting the data points and delivering them to the granted subscribers.

Figure 1:
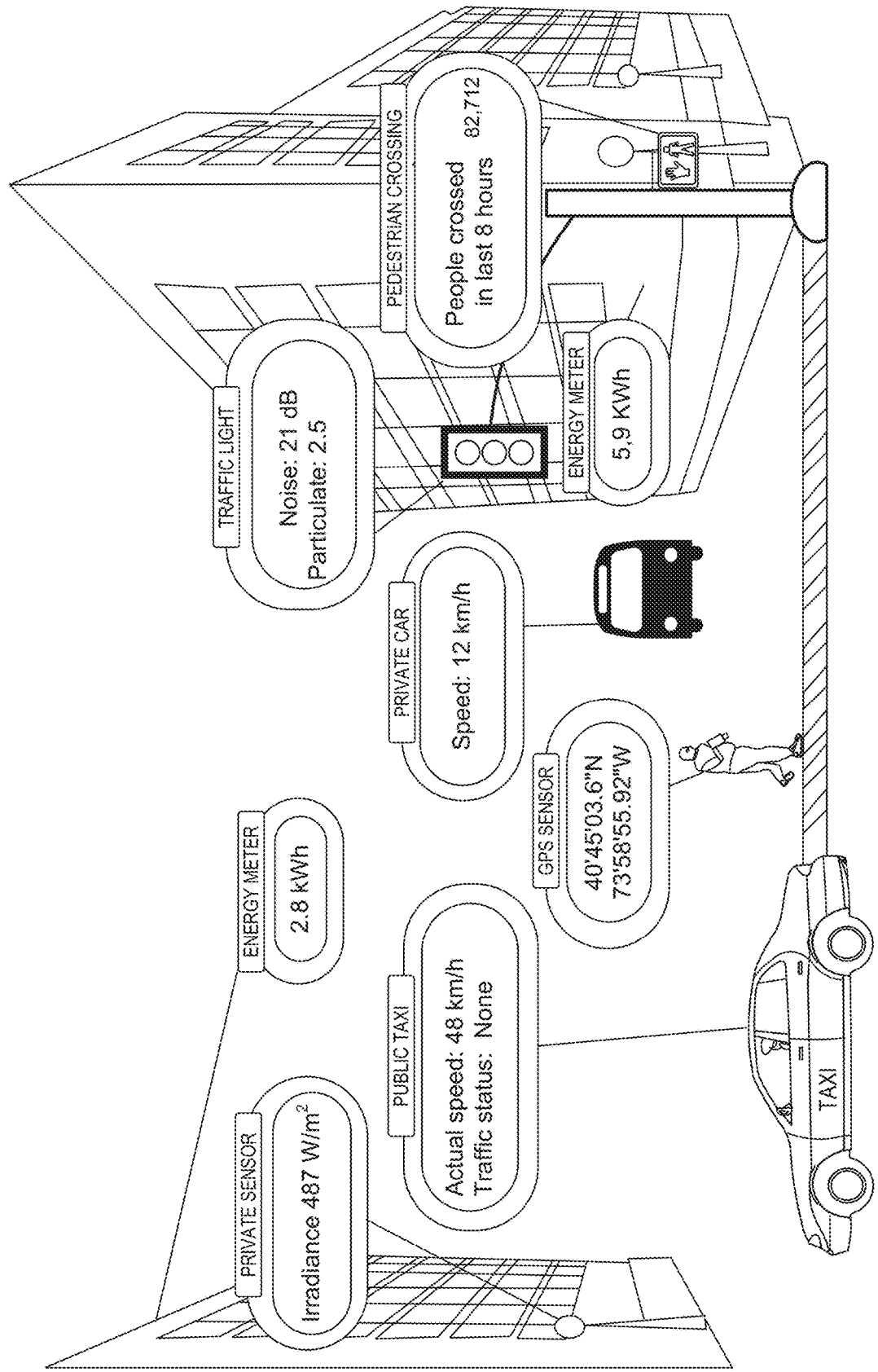
FIG. 1 depicts a street-level view of a given use case of various edge devices in a smart city, according to some embodiments.

FIG. 1 depicts a street-level view of a given use case of various edge devices in a smart city, according to some embodiments. For example, an edge device may be an Internet-of-Things (IoT) device, including but not limited to, a physical microcontroller, computer system, energy meter, vehicular telematics box, environmental sensor, etc., that may further include various ways of connecting to other devices, including via Internet protocol (IP) routing, mesh networking, overlay networking, any equivalents, or any combination thereof. Hardware to implement such connections may include wired or wireless networking via standard protocols or custom (non-standard) protocols, any equivalents, or a combination thereof.

An edge device may include at least one sensor that may be used to collect specific data points. For example, an edge device may include an environmental sensor, a biotelemetry monitor, a geolocation device, a position-tracking device, an inventory-accounting device, a traffic-counter device, a flow-measurement device, any equivalents, or a combination thereof. Edge devices and/or data points may include unique identifiers, types of the data points, edge devices, other connected devices, etc., other related metadata, any equivalents, or a combination thereof.

Figure 21:
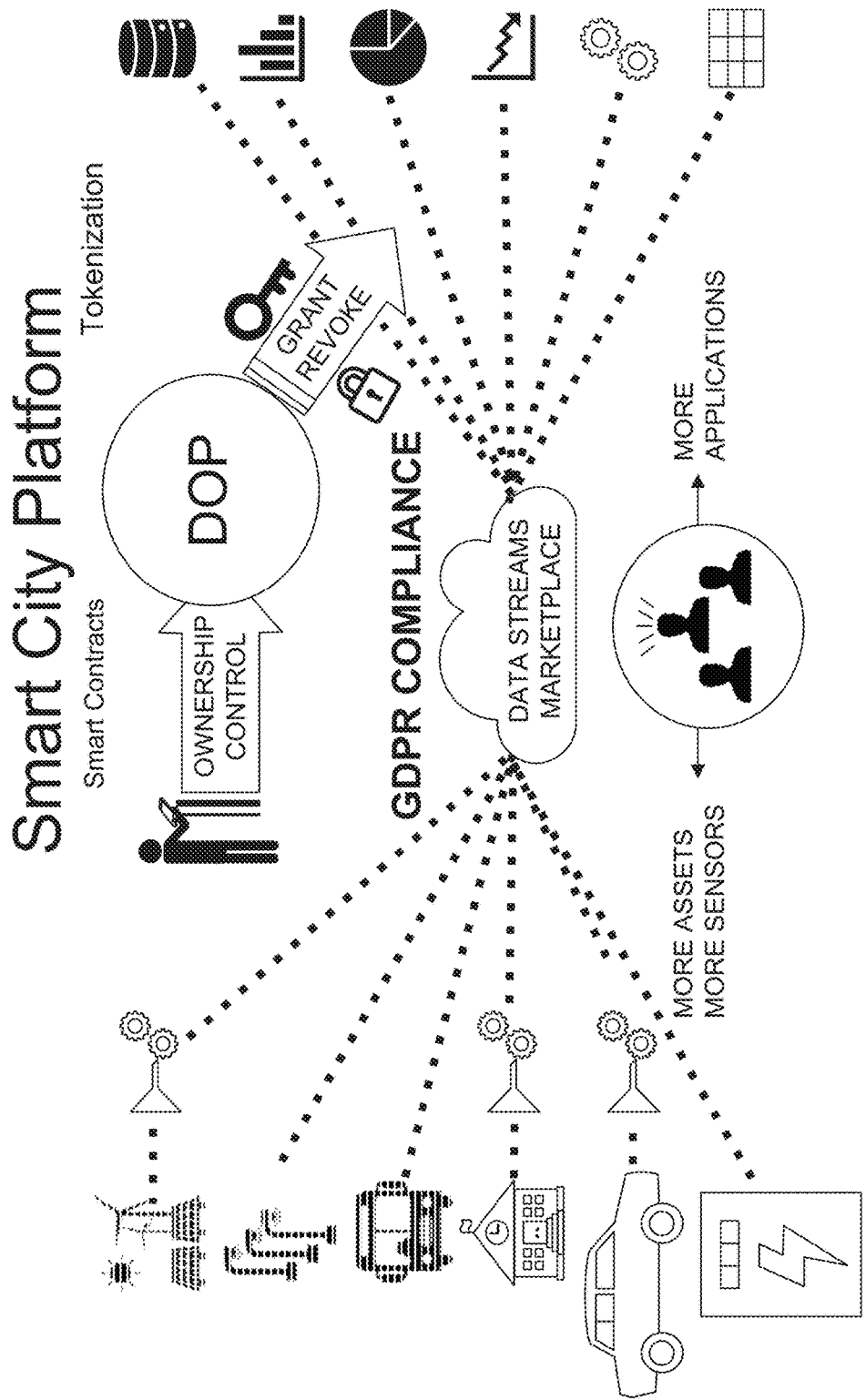
FIG. 21 depicts an example implementation with at least one smart city, according to some embodiments.

The combination of edge devices and sensors shown in FIG. 1 may serve to illustrate a non-limiting example of data that may be collected in a smart city infrastructure, described more broadly with respect to FIG. 21, for example. A smart city may be implemented at any scale, larger or smaller than shown here, as a result of implementing the enhanced technology and techniques described herein.

Figure 2:
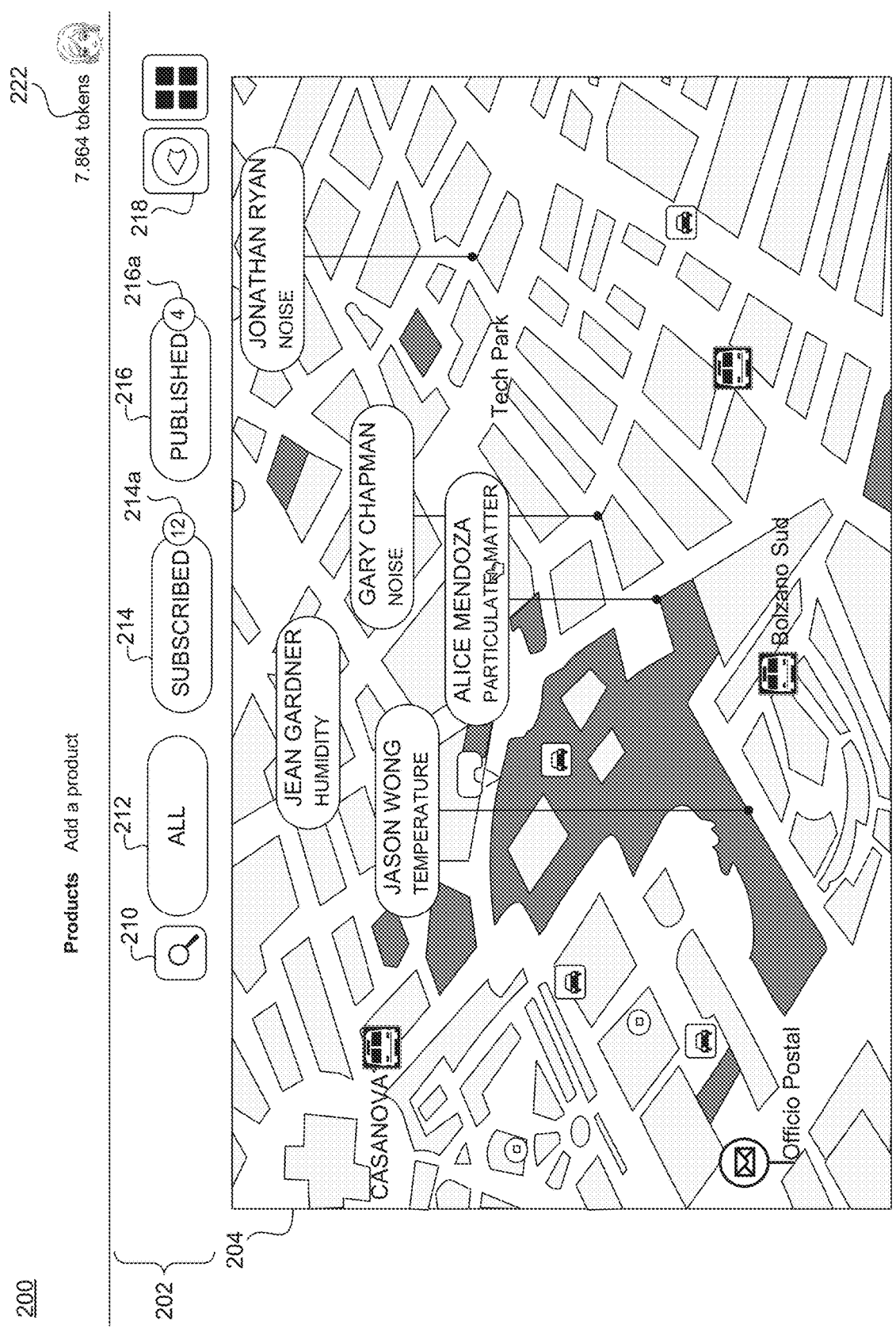
FIG. 2 depicts an interface showing an overview of a given use case of various edge devices in a smart city, according to some embodiments.

FIG. 2 depicts an interface 200 showing an overview of a given use case of various edge devices in a smart city, according to some embodiments. In this non-limiting example, a map 204 may be loaded in a web application or native application, e.g., for general-purpose computers (PC, kiosk, etc.), mobile devices (e.g., tablet, smartphone, etc.), overlaid with indications of edge devices (publishers or publisher devices) available in a given location, corresponding to specific locations on the map 204. Selectable objects, buttons, or other interface handles may be provided for a user to select a given publisher or publisher device, in order to view, manage, or subscribe to the selected publisher's or publisher device's data stream(s) for publication.

Additionally, or alternatively, other interface objects may be provided, e.g., in a designated area or bar 202. A current user profile 222 may be indicated in a separate or adjacent area, which may indicate a token balance and/or other identifying symbol (e.g., photograph, avatar, etc.) for quick reference of the present user account logged in with interface 200. As shown in the non-limiting example of the designated area or bar 202 for other interface objects, there may be included a prompt for searching (e.g., by keywords or other identifiers) to filter available publishers, publisher devices, or data streams, etc.

Other objects, e.g., buttons 212-216, may be provided with predetermined search queries or other identifier criteria, e.g., to filter publishers, publisher devices, or data streams, based on a current user's subscriptions, publications, or all available points on the given map 204 view. Additionally, some buttons, e.g., buttons 214 and 216, may be configured to allow other indications, such as badges 214a and 216a, or equivalent indicia, to display a current quantity of subscribed and/or published data streams, according to some embodiments. View buttons 218 may be used to toggle views, including map views, list views, map-overlay views, any equivalents, or any combination thereof, according to some non-limiting examples.

Figure 3:
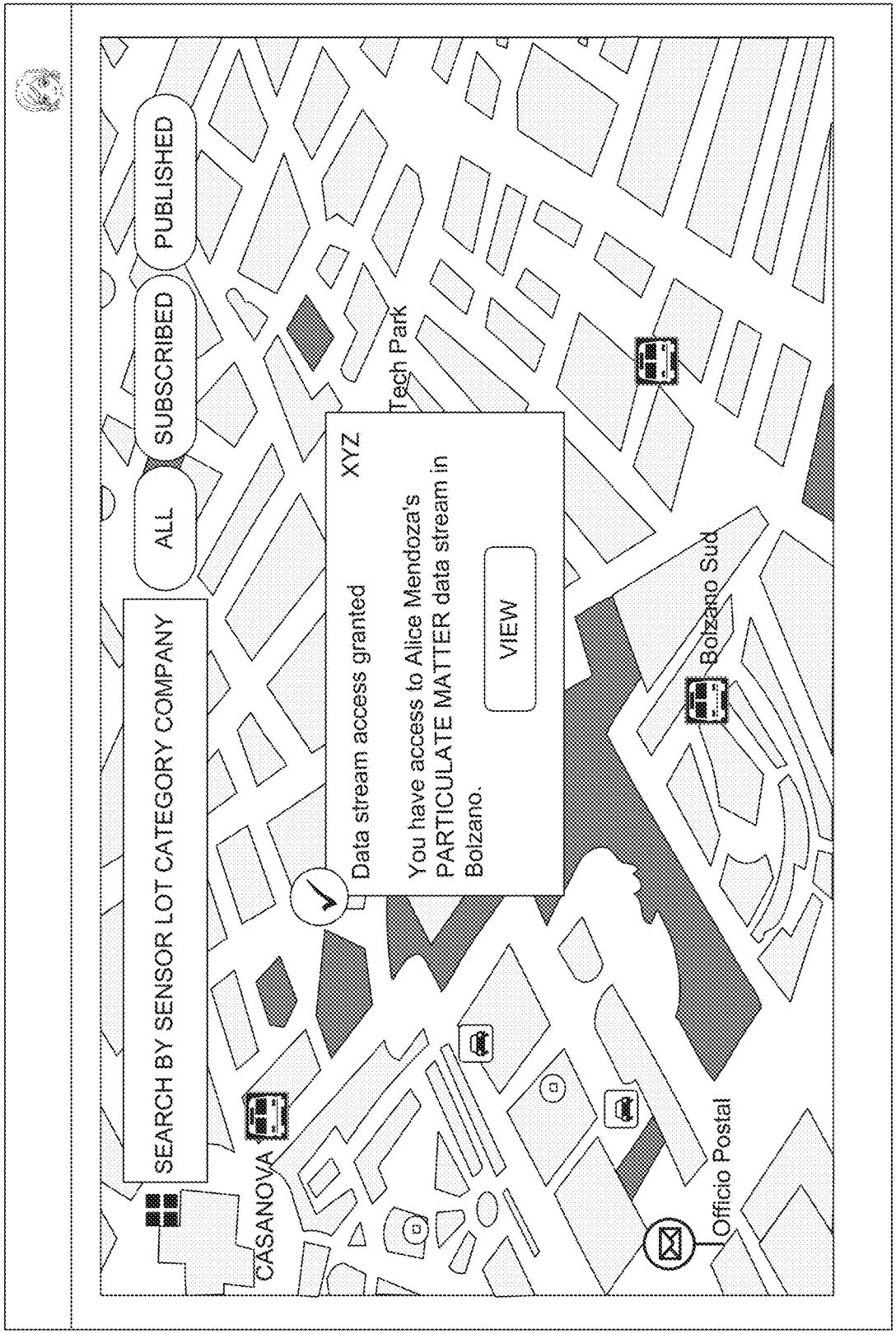
FIG. 3 depicts an example subscriber view of a particular data stream, in context of the overview of FIG. 2, according to some embodiments.

FIG. 3 depicts an example subscriber view of a particular data stream, in context of the overview of FIG. 2, according to some embodiments. As shown by the hand-shaped pointer object in FIG. 2 (which may alternatively represent a direct tap on a touch screen or touch pad, for example), a particulate matter sensor is being selected by a given user. Upon selecting a particular data stream from the map, further information may be provided, with additional options, e.g., for more detailed views and insights into the available information.

Figure 4:
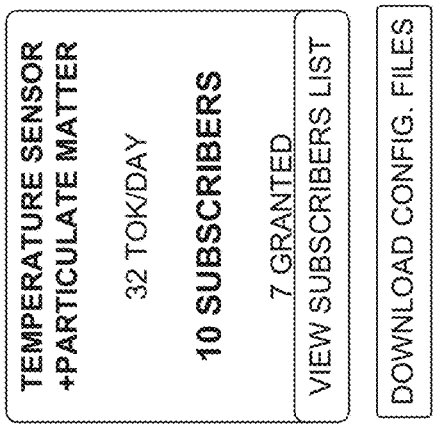
FIG. 4 depicts an example subscriber view of detailed information about a publisher of the particular data stream of FIG. 3, according to some embodiments.

FIG. 4 depicts an example subscriber view of detailed information about a publisher of the particular data stream of FIG. 3, according to some embodiments. For example, when a subscriber selects a more detailed view, e.g., from a prompt as shown in FIG. 3, another screen of more detailed information may be displayed. In some embodiments, if a subscriber has not yet subscribed to the selected stream, a prompt may be displayed for allowing the subscriber to subscribe to the stream. In further embodiments, a subscriber's request to subscribe to a selected data stream, e.g., via a displayed prompt, may trigger a notification to a publisher corresponding to the selected data stream, in order for the publisher to grant access to the requesting subscriber. Examples of a publisher interface to handle subscriber requests are shown in FIGS. 10-13 further below.

FIG. 5 depicts an example publisher view of subscribers for a particular data stream, according to some embodiments. As shown for a given publisher (logged in), FIG. 5 thus shows an example view of a management console for a given data stream, including status of subscribers and subscriptions, as well as present access rights for each subscriber and interface objects to toggle subscription access (grant/revoke).

FIG. 6 depicts an example scrolled publisher view of subscribers for a particular data stream, according to some embodiments. In this view, further information from the example of FIG. 5 may be shown in a given view. In this case, following the non-limiting example of FIG. 5, all ten present subscribers are now shown in the scrolled view of FIG. 6.

FIG. 7 depicts an example publisher action revoking access of a selected subscriber for the particular data stream, according to some embodiments. In this non-limiting example, the logged in publishing user wishes to revoke access to a particular subscriber ("Car Maintenance R") of the selected data stream. Thus, as shown by the hand-shaped pointer object in FIG. 7 (which may alternatively represent a direct tap on a touch screen or touch pad, for example), the publishing user may press a button on a graphical user interface (or equivalent) to revoke access to the selected data stream for the particular subscriber.

FIG. 8 depicts an example result of the publisher action of FIG. 7, having revoked access of the selected subscriber for the particular data stream, according to some embodiments. As shown, the only subscriber whose status has changed was the particular subscriber whom the publishing user sought to revoke. The other subscribers' access rights are left intact, per granular access controls. In some embodiments, other user interface objects may allow selection or deselection of multiple subscribers or all subscribers, for further ease of management.

Figure 9:
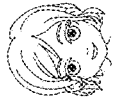
FIG. 9 depicts an example user account of a given publisher, according to some embodiments.

FIG. 9 depicts an example user account of a given publisher, according to some embodiments. Depending on configuration of accounts and/or infrastructure, various fields may be displayed or hidden. A total count of subscribers may be shown, as well as subscribers for whom access is granted or not granted. The subscriber count may be per data stream (publishing device) or per publisher (publishing user) account, according to some example embodiments. Other access management may be provided, e.g., for username-password authentication, multi-factor authentication, other identification, etc. Token balance, e.g., for sending and/or receiving payment for data access, may also be stored and displayed. Tokens may, in some embodiments, correspond to cryptocurrency value and/or may be readily exchanged for other currency, goods, services, data, etc.

Figure 10:
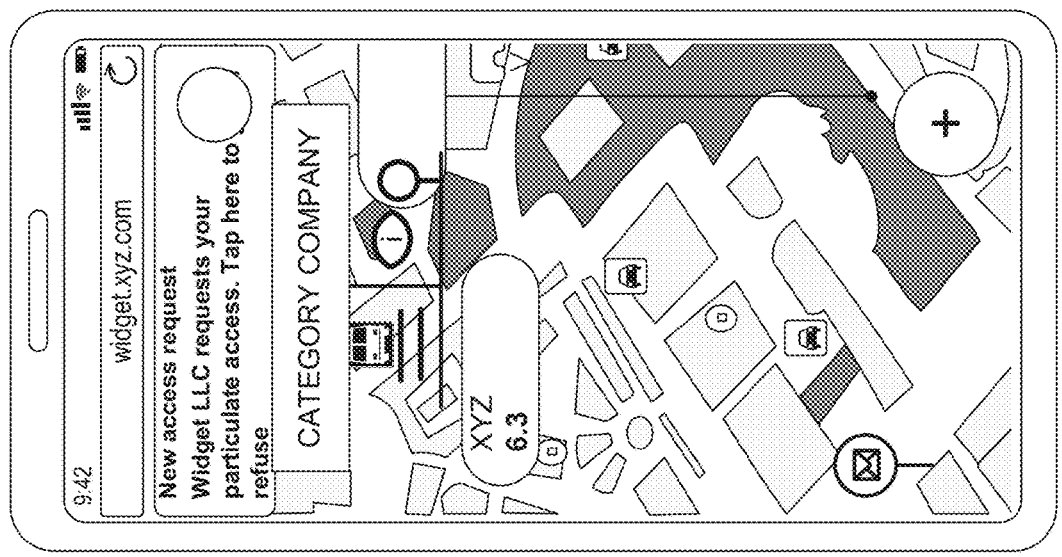
FIG. 10 depicts an example mobile user interface for a publisher, according to some embodiments.

FIG. 10 depicts an example mobile user interface for a publisher, according to some embodiments. Similarly to interfaces shown in FIGS. 2 and 3 above, a map may be displayed, as well as overlays indicating selected publishers, publisher devices, data streams, etc. A notification, e.g., banner notification, may be displayed with a publisher account logged in, indicating that a subscriber has requested access to a data stream indicated, e.g., on the displayed map.

Figure 11:
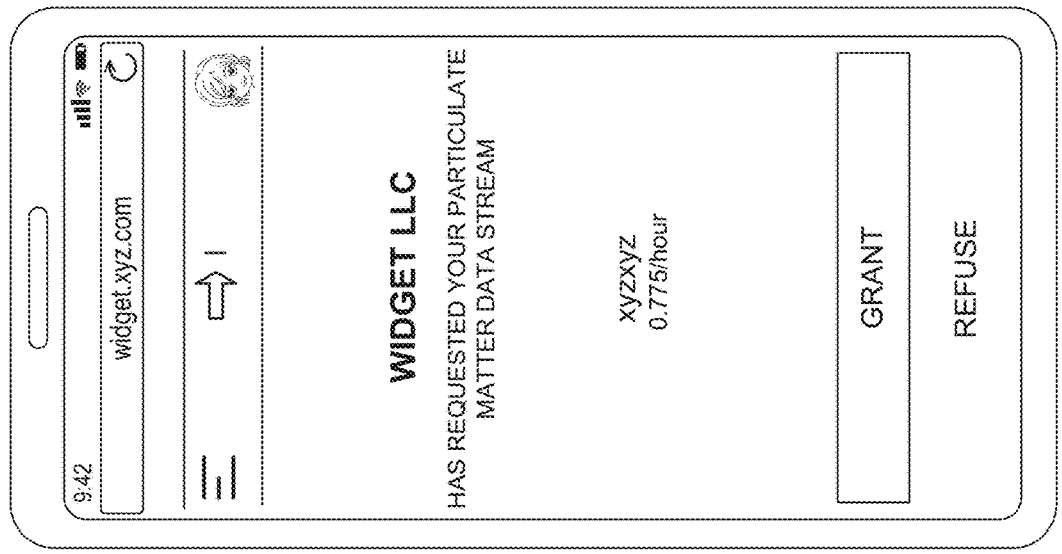
FIG. 11 depicts an example mobile user interface for a publisher to decide whether to grant or refuse access to a requesting subscriber, according to some embodiments.

FIG. 11 depicts an example mobile user interface for a publisher to decide whether to grant or refuse access to a requesting subscriber, according to some embodiments. The screen of FIG. 11 may be shown, e.g., in response to selecting or otherwise activating an action tied to the notification of FIG. 10, for example. In other example use cases the screen of FIG. 11 may be displayed in response to selecting a subscriber or request from a screen similar to that of FIG. 8 or 9 (adapted for any given display device), according to some embodiments.

Figure 12:
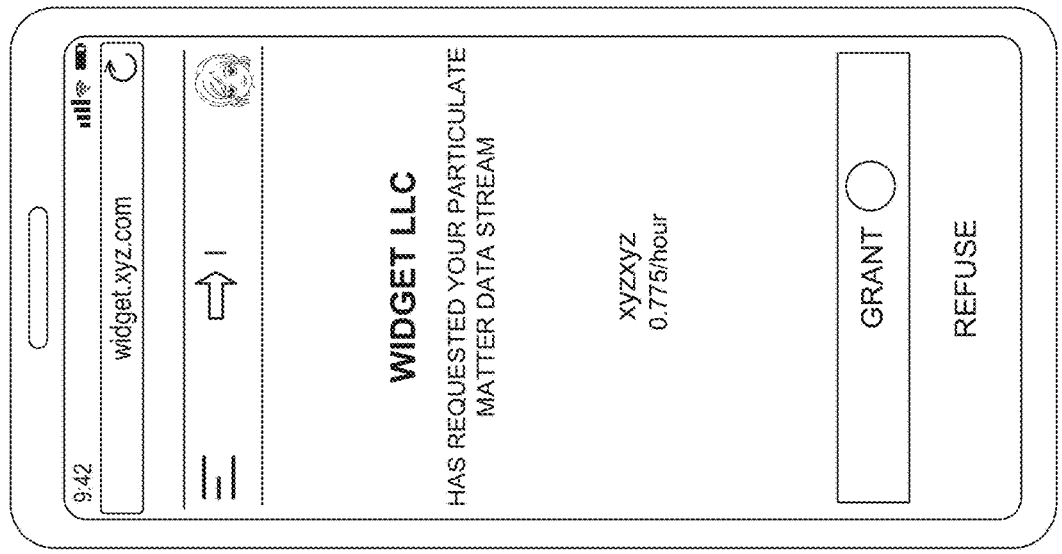
FIG. 12 depicts an example publisher action granting access of the requesting subscriber via the mobile user interface of FIG. 11, according to some embodiments.

FIG. 12 depicts an example publisher action granting access of the requesting subscriber via the mobile user interface of FIG. 11, according to some embodiments. The circle shown within the box of the "grant" button of FIG. 12 indicates a touch event on a touch screen, in this example embodiment. However, any other pointer or selection gesture, equivalent, or any combination thereof, etc., may be used to trigger acceptance of an option to grant access to a given data stream for a given subscriber request. Additionally, or alternatively, consistent with other user-interface examples described herein, a voice interface or haptic interface may be used for input/output.

Figure 13:
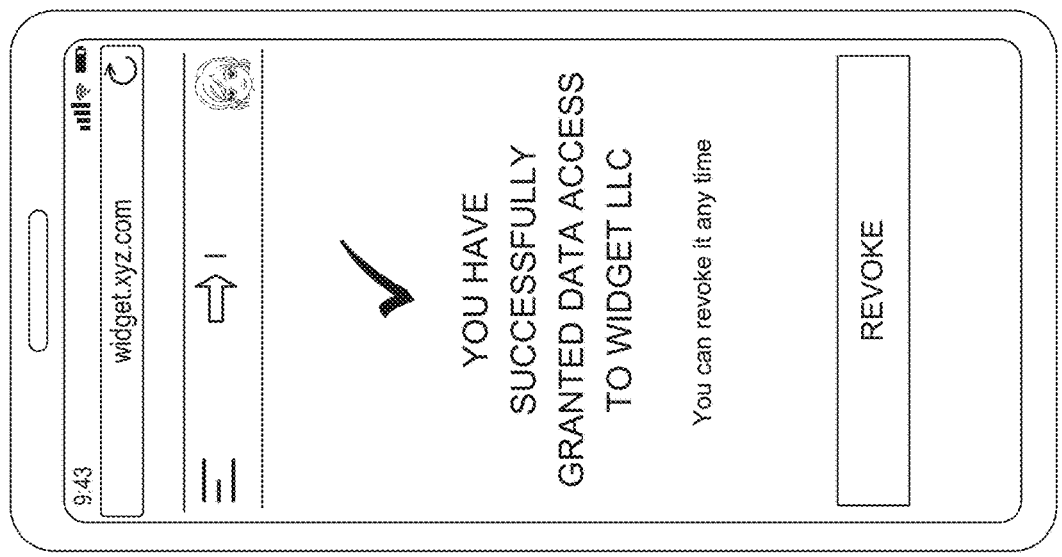
FIG. 13 depicts an example result of the publisher action of FIG. 12, having granted access to the requesting subscriber, according to some embodiments.

FIG. 13 depicts an example result of the publisher action of FIG. 12, having granted access to the requesting subscriber, according to some embodiments. In this case, a confirmation screen indicates that access has been granted to the requesting subscriber, per the action of FIG. 12. An interface object with an option to revoke access is also provided, in this non-limiting example embodiment. Generally, as described further below, access may be granted or revoked arbitrarily at any time by a publishing user who owns the data streams published by the publishing user's publisher devices.

Broker Based Architecture for Data Sharing

In the field of data sharing, data providers (publishers) may adopt an open, broker-centric architecture to provide multiple applications and subscribers with near instant access to the same data stream. Additionally or alternatively, some embodiments may also include a multicast-oriented approach.

A data broker may be third party software that may be hosted using private infrastructure, e.g., on premises, or hosted by at least one third party, e.g., via public cloud services. Brokers may be based on open source communication protocols, such as Message Queue Telemetry Transport (MQTT), Advanced Message Queuing Protocol (AMQP), or Apache Kafka, to name a few non-limiting examples.

In an embodiment, at least one feeder may send or publish at least one data stream to any type of broker or multicast group, for example. The broker may then broadcast the same data stream to all applications that are subscribers of a particular data stream.

A third-party broker-centric or multicast-oriented architecture may provide several benefits. One example is the capability to use the same data stream for different business objectives, by sharing the data stream between different subscribers and different applications. Another example benefit is independence between such different applications and the enhanced technology described in the present disclosure, as data may be accessed via standard, open-source protocols and interfaces, in some embodiments.

Many commercial Internet-of-Things (IoT) platforms adopt a broker-centric approach. For example, Amazon Web Services (AWS) IoT or Microsoft Azure IoT, among others, have implemented broker-centric messaging services for use with IoT applications. The adoption of blockchain has also led to emergence of a new category of platforms, e.g., a data stream marketplace, where data streams may be shared with and/or sold to any number of subscribers.

The possibility of sharing real time data streams via marketplaces, as well as via traditional brokering platforms, such as from Google, Microsoft, or Amazon, among others, brings the question of protecting data ownership to the forefront. Aspects of the present disclosure address this issue, as described further herein.

Data-Ownership Platform (DOP)

The possibility to use data-stream marketplaces to sell data further highlights an issue that has always existed with traditional data broadcasting platforms. For example, how may data owners control third-party access to their data once they have sent it to a data broker? The enhanced technology disclosed herein allows publishers to have control over which subscribers can access their data streams as new data are published.

Using the enhanced techniques disclosed herein, a solution may include a data privacy governance layer. In some embodiments, such a governance layer may be enabled by smart contracts or similar decentralized applications in a blockchain space, for example. Additionally, or alternatively, traditional database management may be used, in lieu of smart contracts, blockchain, decentralized applications, or distributed ledger technology (DLT), to account for relationships between a publisher and any subscriber(s), for example. With blockchain-based decentralized applications, smart contracts, or any combination thereof, with or without any particular third-party broker, a DOP may be a zero-trust or trustless infrastructure, not requiring that any publisher trust any given party, such as a given broker, platform vendor, certificate authority, etc. A zero-trust model may further enhance security of cryptographic keys.

Figure 14:
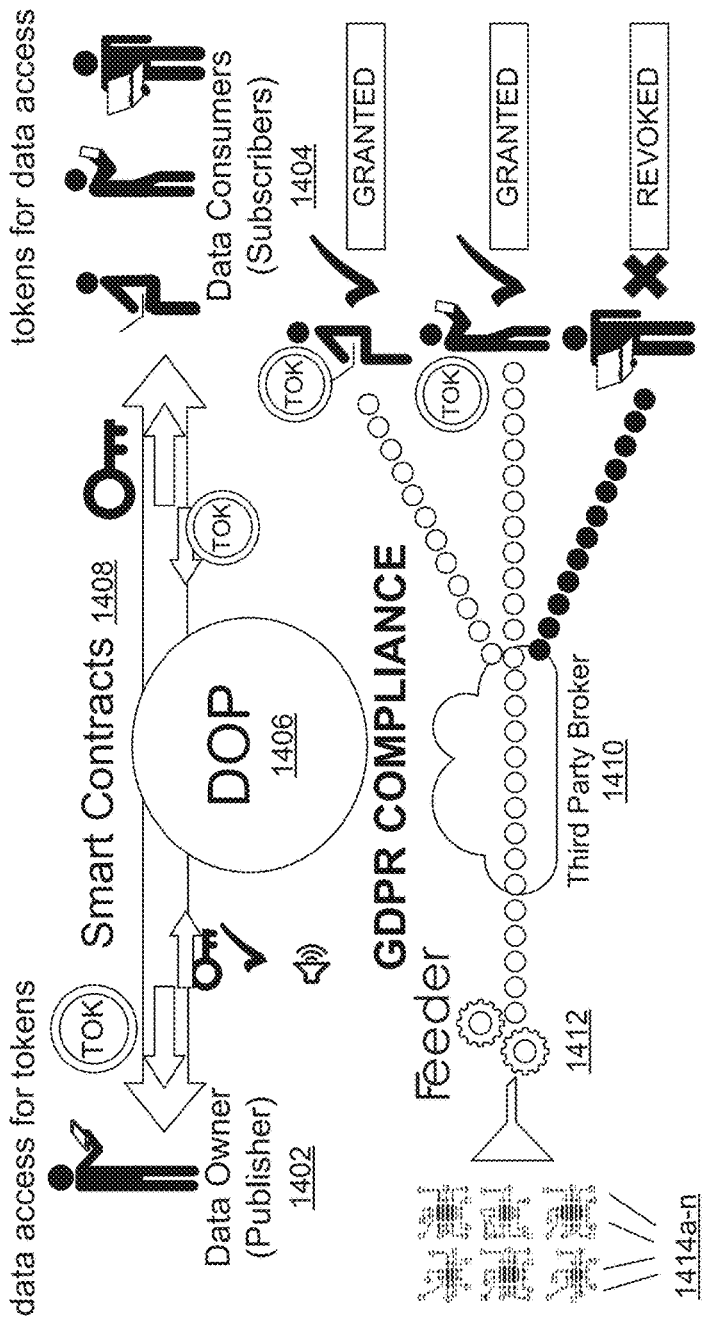
FIG. 14 depicts a relationship between a data owner (publisher) and prospective data consumers, according to some embodiments.

As shown in FIG. 14, a relationship may be established between a data owner 1402 (publisher) and prospective data consumers 1404 (subscribers) by entering into one or more smart contracts 1408. The data stream flowing through the broker may be tokenized, and the data owner may then decide token size and value. This may be in cryptocurrency or other virtual currency or fiat currency, other goods and/or services, or a combination thereof, for example.

Figure 15:
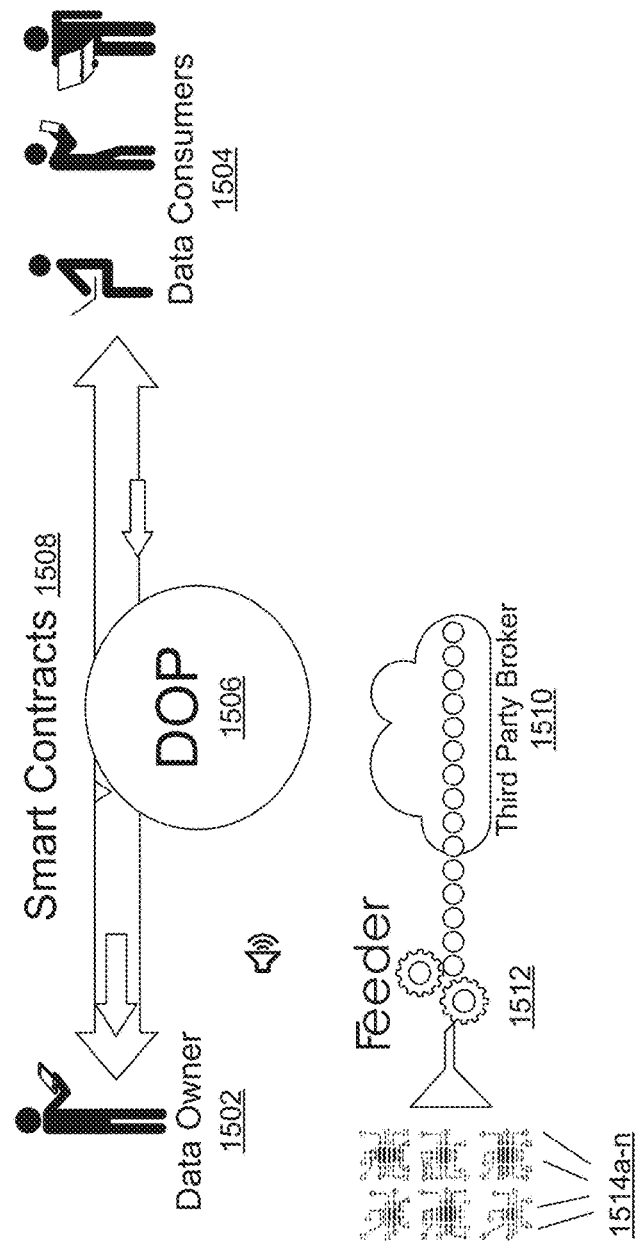
FIG. 15 depicts an initial connection between a third-party broker and edge devices, which may correspond to one or more publishers, according to some embodiments.

FIG. 15 shows an initial connection between a third-party broker 1510 and edge devices 1514a-n, which may correspond to one or more publishers, according to some embodiments. The third-party broker 1510 may be one of any number of third-party brokers, for example. In some embodiments, third-party broker 1510 may be optional, in a more decentralized architecture or ecosystem, according to some embodiments. As shown in FIG. 15, data consumers 1504 (subscribers) have not yet connected to any data streams of edge devices 1514a-n. Subscribers may request access to a given publisher, such as per examples shown in FIGS. 3, 4, and 11, e.g., via third-party broker 1510 or another decentralized architecture or ecosystem.

Figure 16:
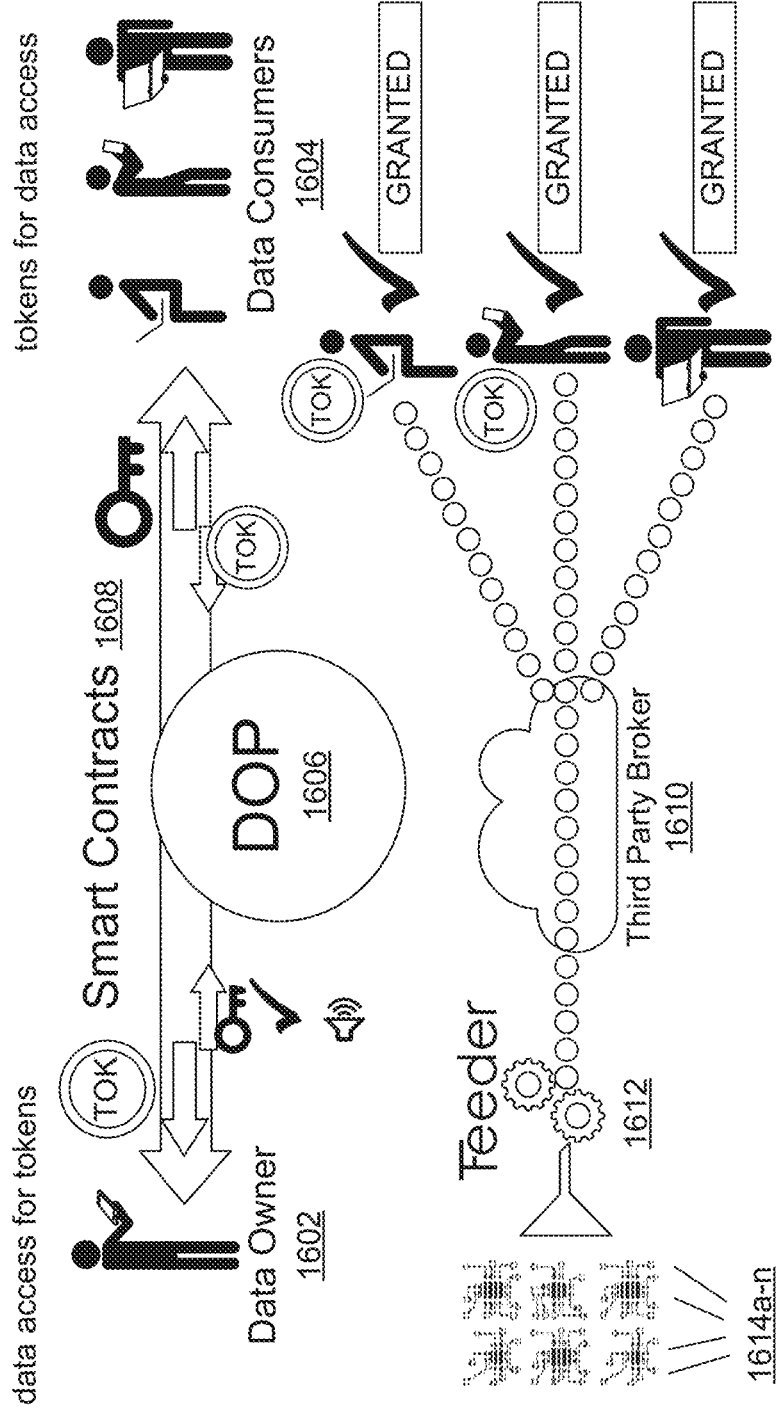
FIG. 16 depicts data stream access provided to a number of subscribers, according to some embodiments.

As shown in FIG. 16, data stream access may be provided to any number of subscribers. For example, when a smart contract has been subscribed, the data owner may grant data access to one or more data consumers. In some embodiments, access to data may be granted conditionally, for example, in exchange for tokens (e.g., cryptocurrency tokens on a blockchain), or other goods or services of quantifiable value.

Figure 17:
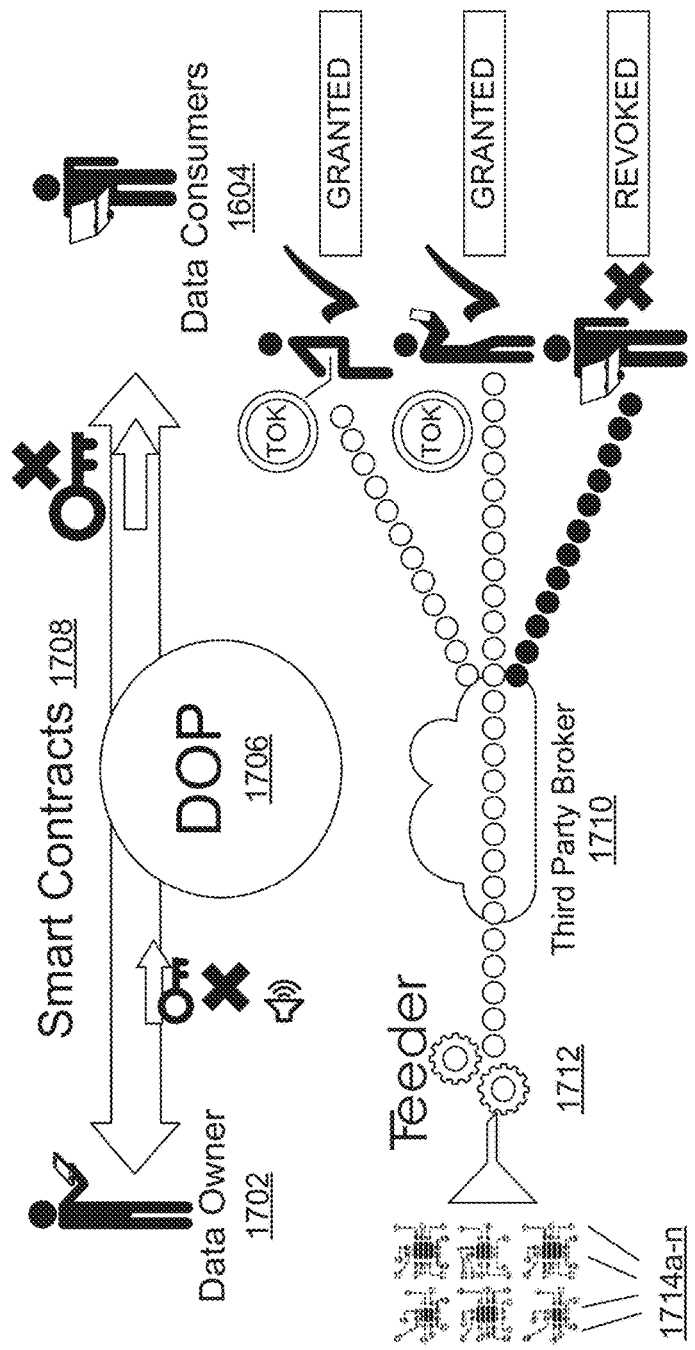
FIG. 17 depicts an embodiment in which data access to a given data stream may be revoked for a particular subscriber, according to some embodiments.

FIG. 17 shows an embodiment in which data access to a given data stream may be revoked for a particular subscriber. As shown in FIG. 16 above, one of data consumers 1604 is not paying tokens for the received data. Hence, the data owner 1602 may choose to revoke data access to this subscriber. Any provider (publisher) may revoke data access for any given data stream to any data consumer (subscriber), at any time, for any reason. In an example, this may occur when a smart contract has not been honored, or when data has otherwise been misused, such as in violation of any other agreement.

Processes of granting or revoking access to data streams may be independent from both the technical data origin and any data presentation layer, e.g., a third-party broker, in some embodiments. Such a technical data origin is shown as a feeder 1412, 1512, 1612, and 1712, in the example embodiments of FIGS. 14-17, respectively, but a technical data origin may also include direct connections to edge devices 1414a-n, 1514a-n, 1614a-n, and 1714a-n, edge devices 1414a-n, 1514a-n, 1614a-n, and 1714a-n, themselves, and/or any sensor or telemetry device on-board any of the edge devices 1414a-n, 1514a-n, 1614a-n, and 1714a-n, for example.

In today's connected world, the enhanced technology of the present disclosure may be used in innumerable scenarios, across all industry sectors, personal mobile devices, wearable devices, homes and vehicles, as well as in smart cities, to provide a few non-limiting examples.

Figure 18:
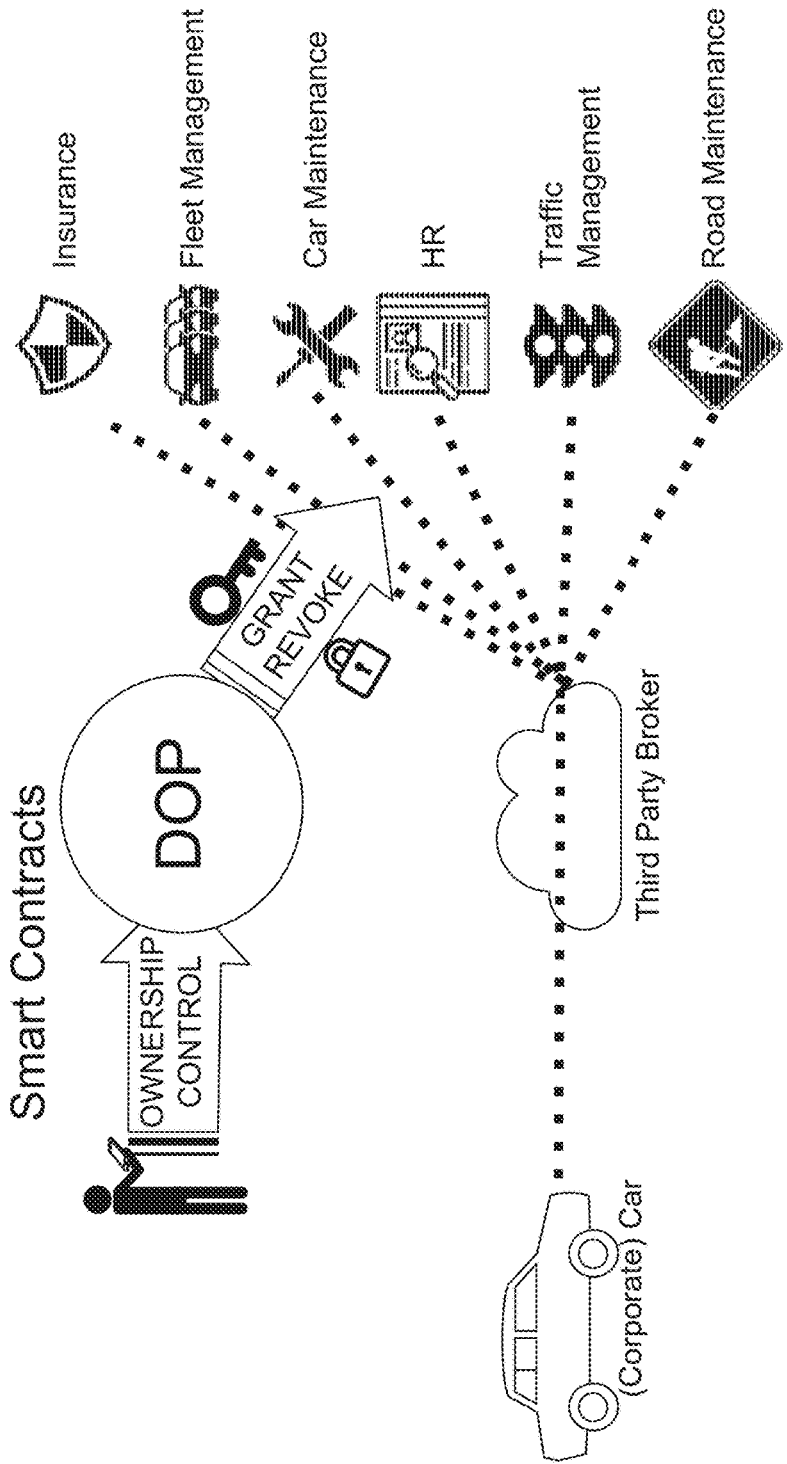
FIG. 18 depicts an example implementation with a vehicular telematics box, according to some embodiments.

As demonstrated in FIG. 18, a driver or owner of a vehicle may be free to choose and change her insurer, additionally choosing whether to share her data from an on-board vehicular telematics box (for example, real time car speed, acceleration, position, fuel efficiency, pollution levels, etc.) with other subscribers, for example, her employer, city authorities, road maintenance companies. In this manner, such data sharing may be carried out in full compliance with the General Data Protection Regulation (GDPR) of the European Union and European Economic Area, and other similar regulations intended to protect privacy of individuals, for example.

Figure 19:
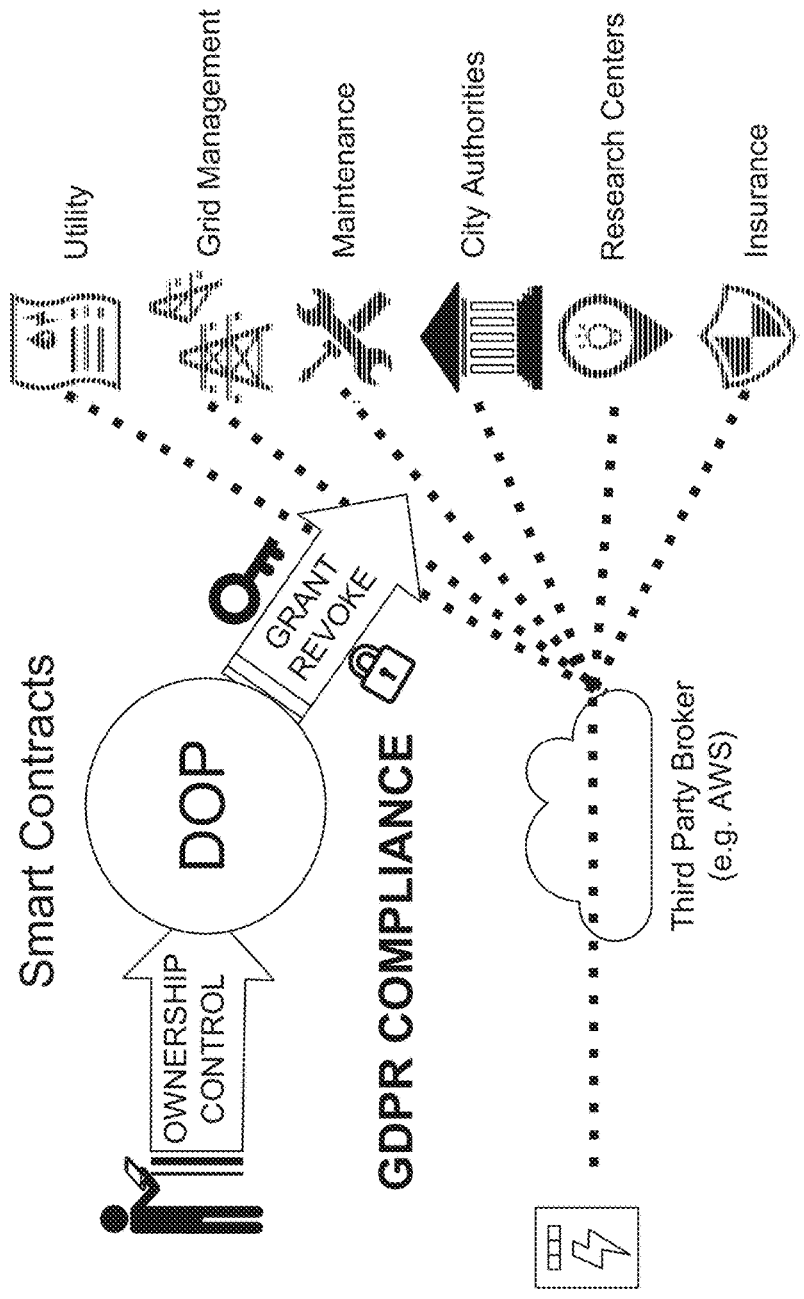
FIG. 19 depicts an example implementation with at least one utility service provider, according to some embodiments.

As demonstrated in FIG. 19, the DOP, using the enhanced technology described herein, may disrupt traditional business models that link a data source—for example, an energy meter—to a single application and subscriber—for example, a utility service provider. An example includes decoupling meters from and utility service providers, allowing utility consumers (as data publishers) more control of the choice and change of utility service providers (as data subscribers). Additionally, or alternatively, data publishers may have options to monetize their data and/or choose which subscribers will be able to access their data, in some embodiments.

Figure 20:
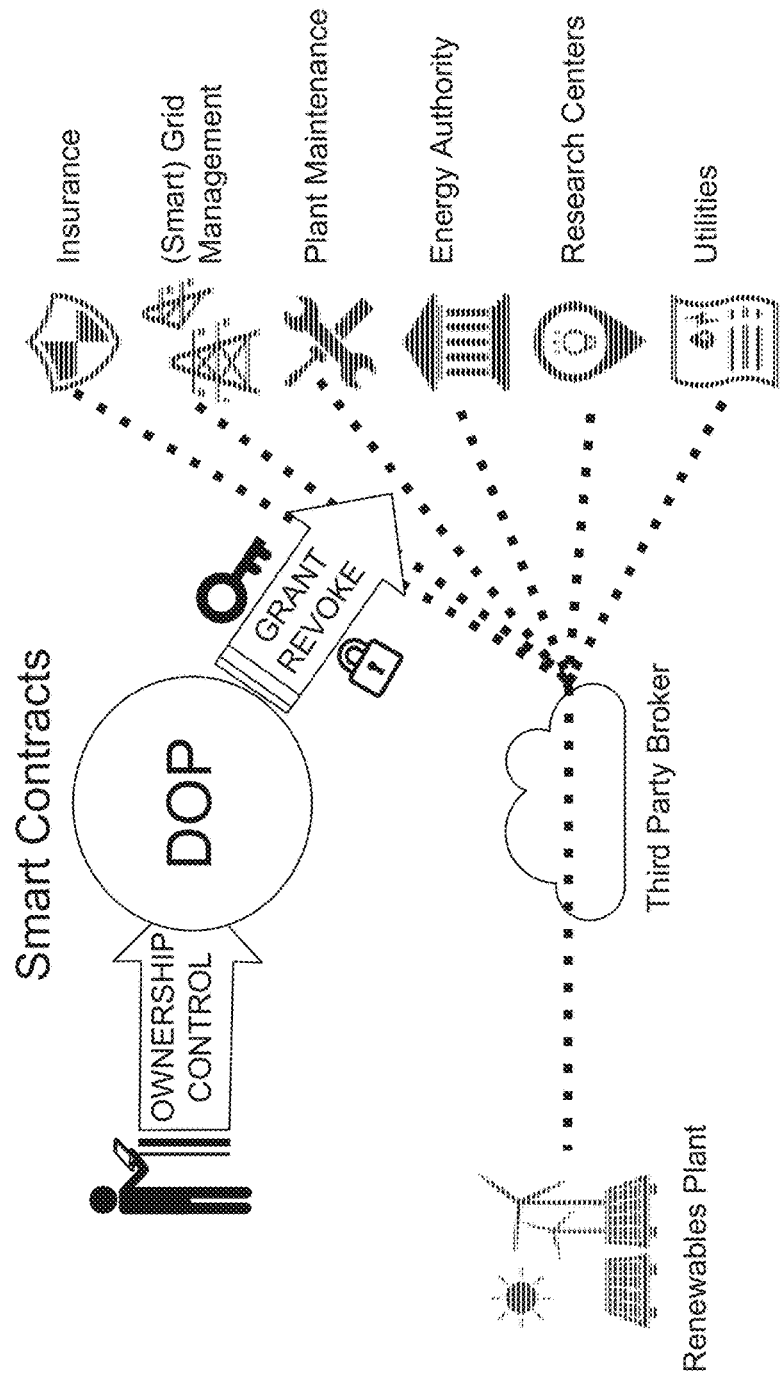
FIG. 20 depicts a business-to-business (B2B) example implementation with at least one utility service provider, according to some embodiments.

As shown in FIG. 20, the enhanced technology as described in the present disclosure may also find applications in B2B scenarios. For example, renewables is a sector that may involve many subscribers, from insurance providers to government authorities. These subscribers may require the same data, but for different objectives, ranging from accounting to smart grid management and/or environmental or safety regulations.

Traditionally, each subscriber may install his own meters and sensors, which, in turn, may send data to his own vertical application. By contrast, a broker-centric architecture, such as that disclosed herein, where data owners may share data streams with all subscribers in exchange for services or cash, may realize significant improvements in cost, efficiency, and convenience for all parties involved. Thus, as demonstrated in FIG. 20, by monetizing data streams and governing their access, the enhanced technology of the present disclosure, including DOP, may be leveraged to allow institutions, companies, and individuals to have control over the data they generate, and to be fairly compensated on an open market for such data.

As shown in FIG. 21, in an example, a smart city platform brings together various potential business scenarios in an open, decentralized infrastructure. A city may fund the development of a smart city portal, where citizens, companies, and institutions will be able to publish and monetize data streams generate by their devices, while maintaining complete control over data access, as a result of the DOP.

By allowing device data streams to be tokenized and shared with subscribers in a controlled way, a business cycle may be initiated by feeders, e.g., 1412, 1512, 1612, and 1712, in the example embodiments shown in FIGS. 14-17, respectively.

However, the feeders may be independent from DOP. In other words, feeders may be applied to data streams generated by any technology. Additionally, feeders may be independent from the platform transporting the data. In other words, feeders may be used with any data broker as well as with any data streams marketplace. For these reasons, the present disclosure may provide a universal privacy technology overlay, compliant with data privacy regulations such as the GDPR, including allowing a party controlling any datastream sharing platform or broker "to demonstrate that [a] data subject has consented to processing of his or her personal data," as well as that "[t]he data subject shall have the right to withdraw his or her consent at any time" and that, for any given data subject (publisher), it is "as easy to withdraw as to give consent," all as presently required by the GDPR.

The enhanced technology of the present disclosure, while compatible with existing database-oriented solutions, may additionally or alternatively leverage blockchain-based smart-contract technology to deploy a data access governance layer that may be used to regulate data streams sharing for institutions, companies and individuals, according to some embodiments.

Advantages Over Related Technology

Compared with other relevant technologies in the blockchain space, the enhanced technology of the present disclosure provides, among other benefits, several differentiating, technological factors:

The enhanced technology of the present disclosure may control access to data streams, not data sets. This eliminates a need for platform storage and data repositories, which is a substantial requirement for both Enigma and Ocean Protocol, making the enhanced technology of the present disclosure a more agile and scalable technology. Reducing or eliminating the storage requirements may further improve performance by reducing memory overhead for managing storage and may reduce or eliminate costs of renting or operating storage infrastructure.

The enhanced technology of the present disclosure tokenizes data streams as they flow from their technical source, whereas both Enigma and Ocean Protocol must propagate data to their persistence providers prior to tokenization and access control, creating a potential security vulnerability.

The enhanced technology of the present disclosure controls access to data streams independently from the data transport layer, whereas both Enigma and Ocean Protocol instead provide their own data access layer. Adding custom-made, unique layers of abstraction in this way may pose risks for security and data loss, whereas controlling access to data streams independently from the data transport layer may instead provide a more robust system with fewer vulnerabilities and a smaller attack surface.

Within the scope of the present disclosure, there is no specific requirement for any centralized or shared resources or components that may have any responsibility to calculate any group key. Instead, in some embodiments, cryptographic keys may be calculated or produced by senders, e.g., publisher devices as technical origins of data streams. There may be several benefits to this approach. For one, senders may avoid also being receivers, which may especially enhance security and performance for IoT scenarios, for example. If senders would also need to be receivers (agents waiting for incoming traffic), then it may not be possible to adopt a strong push-only (data diode) paradigm from edge to cloud. Thus, in contrast to certain existing methods, such as that presented in U.S. Pat. No. 5,748,736 ("System and Method for Secure Group Communications via Multicast or Broadcast," issued May 5, 1998), the enhanced technology of the present disclosure may allow implementation of multicast encryption even in the presence of data diodes at the edge.

Additionally, sending a multicast transmission containing a new key encrypted using an old key to the current multicast group and telling them to now use the new key may imply a high quality of service of the channel used to broadcast the new key. In this scenario, one or more members of the multicast group may not receive the message containing the new key, which may thus be problematic.

Droplet (referring to Shafagh et al., "Droplet: Decentralized Authorization for IoT Data Streams," arXiv: 1806.02057v1 (Jun. 6, 2018)) describes a different approach from Enigma or Ocean Protocol, where "a decentralized data access control service" may "operate[ ] without intermediate trust entities." However, this approach as described in its 2018 paper also relies on online storage of data generated by publishers, even though Droplet may be storage-type agnostic (e.g., P2P storage, on-premises storage, cloud-based storage, etc.). Droplet's data model includes continuous streams of time-series data stored in chunks over defined intervals (e.g., "Droplet" at page 8), but thereby requires potentially large provisioning of storage.

By contrast, unlike any of the above approaches of Enigma, Ocean Protocol, or Droplet, the enhanced technology of the present disclosure has no specific requirement for any particular quality of service (QoS), which may otherwise be needed to keep costs manageable in in large IoT deployment using previous technology. In some cases, where reliability is sufficiently needed such that loss of any message would be a critical failure, requiring such QoS may render conventional IoT systems unusable, whereas the enhanced technology of the present disclosure does not have such requirements or limitations. Compared with Droplet, Enigma, and Ocean Protocol, the enhanced technology disclosed herein may instead reduce or eliminate storage requirements, significantly reducing overhead of provisioning and managing data storage for encrypted payloads, which the previous systems rely on.

Figure 22:
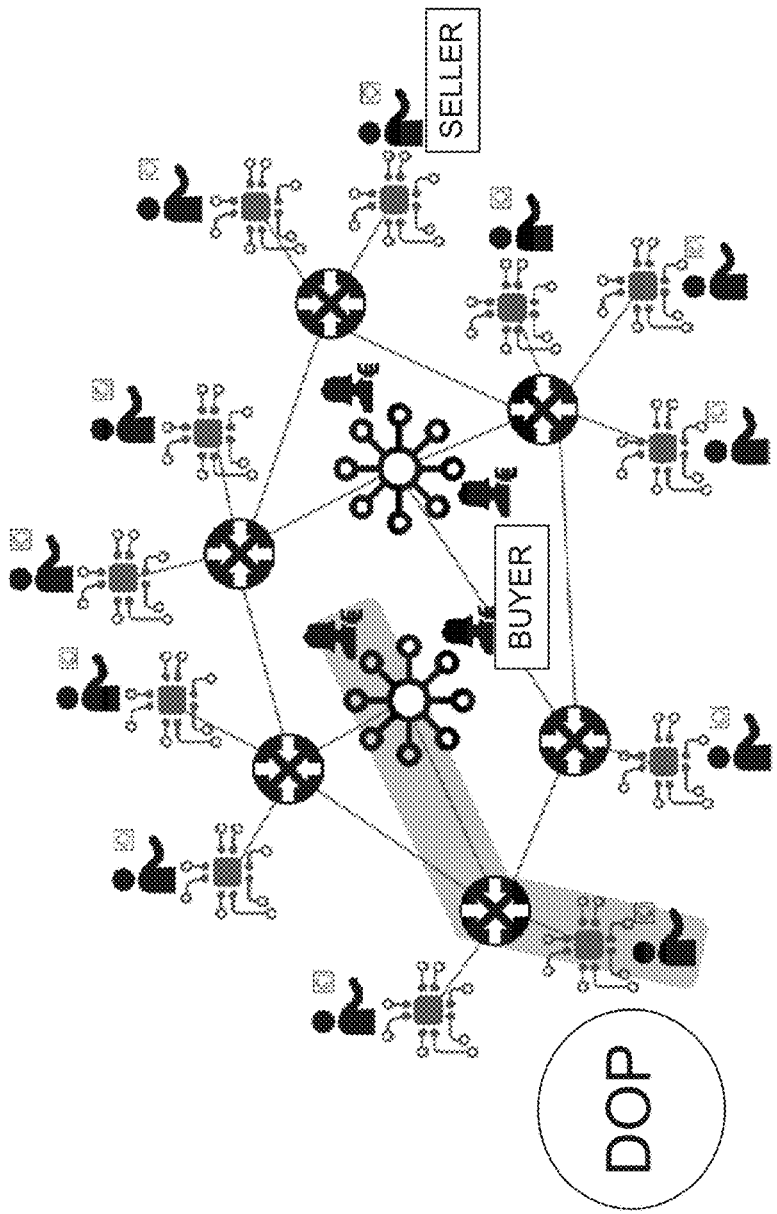
FIG. 22 depicts an example diagram of technology used to implement an overlay network, according to some embodiments.

Additionally, as demonstrated in the example diagram of FIG. 22, the enhanced technology of the present disclosure may be used to implement an overlay network, which may in turn allow use of several different underlying transport protocols by encapsulating DOP-specific packets into packets of any underlying transport protocol.

Generally, any overlay network may require edge components devoted to encapsulation and de-encapsulation of the packets traversing the overlay. A third component may be required to establish a strong relationship amongst the subscribers that produce information and the subscribers that consume information. This third component may be responsible for ownership management and for information tokenization.

The overlay network of the present disclosure may fit very well with various different networking topologies. Thus, the overlay network may be used with a focus on broker-centric topologies, though the overlay network is not limited only to that use case. As broker-centric topologies may be better suited for the data-sharing economy, broker-centric topologies may provide a strong definition of publisher (producer/seller) and subscriber (consumer/buyer) but may be deployed over any multicast-oriented network.

One aspect of the present disclosure is horizontal scalability. The architecture disclosed herein may achieve horizontal scalability by decentralization and distribution. An implementation of the component responsible for the mediation between the publishers and the subscribers may, in some embodiments, be based on smart contracts, e.g., via Ethereum or Hyperledger blockchains, to name a few non-limiting examples, while the workload devoted to packet encapsulation and de-encapsulation is distributed over publishers and subscribers. Thus, a linear relationship may be achieved between workload and system capacity. The encapsulation workload may not necessarily depend on the number of subscribers. Blockchain technology may allow for decentralization—in other words, blockchain technology may provide a technical means to control ownership without delegating such control to any third party.

As the enhanced technology of the present disclosure may be implemented as an overlay network, it may be deployed on top of several different available protocols. The ability of using a proven, mainstream protocol may thus allow deployment of any DOP or related overlay network that may be needed in the field.

To date, selection of a specific protocol may be driven by the following factors: scalability, language binding availability, availability and message routing capabilities. The following protocols/implementations might expose a good fit: MQTT, NATS, Kafka, DSS, Solace, etc. Some of them, like MQTT, may be becoming outdated, while others, such as Kafka and NATS, may offer further opportunity to build wide ecosystems for data stream sharing.

Message-routing capabilities may be considered when selecting a broker-oriented infrastructure for data stream marketplaces, for example. Flexibility with which messages can be routed from publishers to subscribers may especially be taken into account, along with evaluation of other related topics such as temporal order and various level of filtering.

There may also be some broker-oriented infrastructures that honor requirements for some data marketplaces, which may create a need for ways to establish strong relationships between blockchain nodes (e.g., Ethereum, Hyperledger, and/or other distributed-ledger platforms, etc.) and the nodes implementing a cluster, no matter the size, implementing the broker-centric infrastructure. A consideration of decentralization may be avoiding any centralized "zookeeper" component. Even a centralized component such as this may be re-implemented using a decentralized ledger. However, a proof-of-stake model may imply some level of centralization, and such level may also fit with a data stream marketplace, according to some embodiments.

While not limiting as any minimum or maximum requirement, the present disclosure provides at least the following components of an example DOP deployment, according to some embodiments:

One or more publishers: publishers may be data owners who own edge devices (and items attached thereto) originating the data stream payloads.

Broker: publishers may send their data streams to at least one broker. A broker may be a standard third-party software component, for example.

One or more subscribers: subscribers are parties interested in accessing the data streams. Subscribers subscribe to a data stream via the broker.

The blockchain platform: subscribers may only access the data streams traversing the broker by subscribing to a smart contract implemented by the blockchain platform, according to some embodiments. Once an individual subscriber has subscribed to a smart contract, the publisher may receive a notification and decides whether to grant the subscriber access a data stream. The blockchain platform may be at least part of a third-party software component, for example. The blockchain platform may refer to both publishers and subscribers as externally owned accounts, and any corresponding blockchain may be permissionless and/or decentralized.

FIG. 23 shows an example console of a data-stream publisher. The publisher sends data streams to the third-party broker. Data sent to the third-party broker may be encrypted, and may be visible as decrypted data only by those broker's subscribers who have been granted data access by the publisher. The records shown in FIG. 23 may be decrypted so that they may only be visible to a subscriber who has been granted data stream access by the publisher. The data records may be synthetic. They may contain a variable timestamp and a fixed string, in some embodiments.

The publisher's presentation provider may communicate with a third-party broker and a blockchain platform implementing the smart contract associated with the data stream through a proxy server A third-party broker may use NATS for messaging, although the disclosure is not limited to NATS. Any other equivalent technology may be used, as described elsewhere herein and as may eventually replace NATS and similar solutions in the future. Ethereum or another platform may be used as a blockchain platform, e.g., supporting smart contracts and decentralized applications, for example, but any other blockchain platform supporting similar features may be used (e.g., Hyperledger), or a non-blockchain solution (e.g., database) may be used, in some embodiments.

FIG. 24 shows encrypted data sent by the publisher to the broker. Data may be encrypted prior to being sent to the broker. The publisher's presentation provider may communicate with the blockchain platform through a proxy server.

FIG. 25 shows an example log of a proxy server. A proxy server of one example may enable the interaction between the publisher and the blockchain platform executing the smart contracts associated to data streams.

FIG. 26 shows an example log of an Ethereum node that may be used to execute a smart contract associated with a referenced data stream, according to some embodiments.

FIG. 27 shows an example console executing the program implementing a subscriber. The subscriber may communicate with a back-end service, e.g., via a presentation provider or other interface. In order to access the data stream, it may be necessary for the subscriber to complete several separate actions, such as subscribing to a specific data stream traversing the broker or subscribing to the smart contract associated with the data stream.

In an embodiment, the subscriber may subscribe to the broker but not to the smart contract. The subscriber may access new data packets from the stream, which may still be encrypted and therefore are unreadable to the subscriber who thus does not have access to the latest keys.

Figure 35:
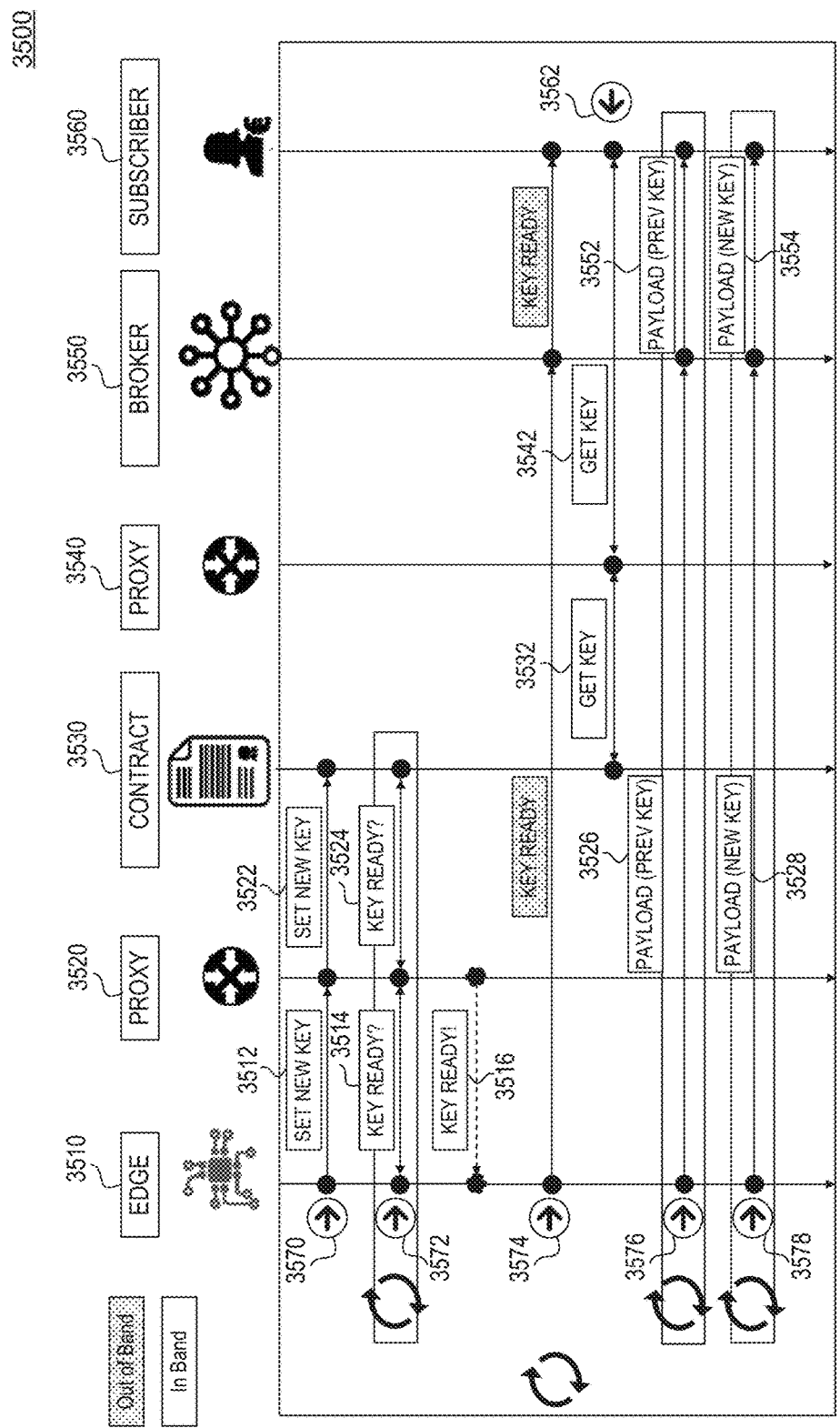
FIG. 35 depicts a process flow diagram of a system implementing a protocol for implementing DOP as an overlay network using capable edge devices, according to some embodiments.

Another embodiment of the disclosure may include at least the following elements: a smart contract executed by one or more blockchain nodes, as shown in FIG. 26, or a proxy server enabling the interaction between the publisher and the blockchain platform, as in FIGS. 35 and/or 36.

Externally owned accounts (EOAs) may be created (for example, one publisher and several subscribers) within the Ethereum platform, together with one smart contract that tokenizes one data stream, according to an embodiment.

FIG. 28 shows an example Ethereum console with two EOAs. In this embodiment, the EOA 'ele' is the publisher owning the data stream and the EOA 'graz' is the subscriber looking to access the data stream, for example.

In FIG. 29, an example Ethereum console shows the address of the smart contract associated with the data stream. These addresses may be used in the prototype front end (user interfaces) for data stream access control.

FIG. 30 shows an example front-end for a publisher management interface. The interface of FIG. 30 may be a web-based front-end, for example. This interface may allow the publisher to maintain visibility over any or all subscribers (which may be represented as EOAs), for example, and may also start a billing cycle, according to some embodiments. In an embodiment, this operation may be executed automatically by the back-end. There are no subscribers yet, as shown in FIG. 30.

FIG. 31 shows an example screenshot of a subscriber front-end management interface, which may allow the subscriber to request access or subscribe to a data stream, relinquish access or unsubscribe to the data stream, or deposit tokens if the data stream access has a cost associated with it, according to some example embodiments. This interface of FIG. 31 may be a web-based front-end, for example.

FIG. 32 shows an example of having added a subscriber. The interface may also be used by a publisher to grant and revoke data stream access to any given subscriber, at any time, for any reason. Here, the publisher EOA corresponds to the "ele" address and the product address corresponds to "dop.address," as discussed previously. As shown in FIG. 30 above, there were no subscribers. In FIG. 32, the publisher front-end screenshot shows a subscriber that has been granted data stream access and has a positive credit balance (e.g., 5,000,000 tokens).

In FIG. 33, an example screenshot shows a corresponding subscriber status in the subscriber's front-end by way of the fields Subscription, Granted, and Credit, to name a few non-limiting examples.

FIG. 34 shows output of an example console executing an implementation of a presentation provider for the subscriber, now with access to the publisher's payloads. In the example, the publisher has now granted data stream access to this subscriber, and information in the data stream may now be decrypted going forward. According to some embodiments, the information shown may now be displayed in the same way as shown by the publisher, as described previously, e.g., as in FIG. 23.

Protocol Employing End-to-End Multicast Encryption

FIG. 35 shows a process flow diagram of a system implementing a protocol for implementing DOP as an overlay network using capable edge devices, e.g., in which edge devices include hardware and software capable of generating cryptographic keys. In an embodiment, at 3570, edge device 3510, at a given frequency (e.g., after a predetermined time and certain intervals), may calculate a new key. Next, the new key may be sent 3512 to proxy 3520.

Proxy 3520 may then forward or store 3522 the new key to the blockchain platform, using a smart-contract 3530 interface, according to some embodiments. Additionally, or alternatively, a packet containing the request for a new key may also contain an integer representing the number of bytes that have been encrypted up to that point. This integer may be stored in a smart contract or other storage means, and may allow for data-volume-based rating models, for example.

Edge device 3510 may, at 3572, repeat requesting if the new key has been stored and if it is ready to be used. In an example embodiment, in which edge device 3510 may be implemented as a data diode (no incoming data-stream payload traffic, only emitting data), such repetition of requests may improve reliability of systems as a whole, in the absence of other synchronous communication between nodes. In some embodiments, at 3572, edge device 3510 may request whether a cryptographic key is ready for use (e.g., using KEY READY request 3514), such as directly checking a smart contract 3530 or via proxy 3520, to check or otherwise query a status of smart contract 3530. Additionally, or alternatively, a database that supports queries for key status may be used instead of or alongside smart contract 3530.

Once the new key has been stored and may be ready to be used, edge device 3510 receives a KEY READY message 3516 from proxy 3520. When edge device 3510 knows that the new key is ready, edge device 3510 may send an out-of-band message to broker 3550 indicating "be ready, a new key is going to be used shortly," according to some embodiments. An example use case may allow, by way of the KEY READY message, for workloads caused by multiple subscribers to be spread out by a factor of time T, where T may be an amount of time to elapse between announcement of the KEY READY message and actual use of the new key. As a result, this out-of-band message (KEY READY) may facilitate horizontal scalability and may increase quality of service. Moreover, in an embodiment, where cryptographic keys and/or KEY READY announcements are sent separately from the channel or packets containing the encrypted payload, then keys may be delivered to subscribers successfully even when the payload channel has low quality of service, for example. However, such a message as at 3574, or even a broker 3550, may not be necessary in all use cases—without the announcement, subscribers that have access to the new keys may acquire each new key at or near predetermined time intervals (e.g., set by a configurable frequency) for periodic management of cryptographic keys.

At 3562, subscriber 3560 may ask proxy 3540 for the new key (GET KEY request 3542), which may be stored but not in use yet, e.g., by checking smart contract 3530 (GET KEY request 3532). The new key may be given to subscriber 3560 if subscriber 3560, based on smart contract status, is 1) granted and 2) has enough credit, according to some embodiments. However, such functionality may, in other embodiments, be implemented using database solutions not necessarily tied to blockchain or smart-contract implementations.

Based on a given configuration, at 3576, the payload may, for a duration of time, be sent 3526 by edge device 3510 to broker 3550 and may be encrypted using the previous key 3552, for example.

After a duration of time (e.g., set by a configurable frequency), at 3578, the payload may then be sent 3528 by edge device 3510 to broker 3550 encrypted using the new key 3554. In this scenario, if a subscriber had no access to the new key, the subscriber would lose visibility of the payloads that would have been encrypted using the new key, allowing periodic management of cryptographic keys.

In another embodiment, edge device 3510, at a given frequency, may calculate two new keys: a first key (Key A) to encrypt payloads, and a second key (Key B) to encrypt Key A. Next, the new first key (Key A) may itself be encrypted using Key B, after which the encrypted Key A may be sent 3512 to proxy 3520.

Proxy 3520 may then forward and/or store 3522 the new encrypted key to the blockchain platform, e.g., using a smart-contract interface, according to some embodiments. Edge device 3510 may then repeat requesting if the new encrypted key has been stored and if it is ready to be used. Edge device 3510 may repeat requesting, because edge device 3510 may, in some embodiments, be implemented as a data diode without being configured or allowed to handle incoming traffic.

Once the new encrypted key has been stored and is ready to be used, edge device 3510 may then receive a KEY READY message 3516 from proxy 3520. Once edge device 3510 knows that the new encrypted key is ready, edge device 3510 may send, based on a given configuration, in some embodiments, an out-of-band message to a corresponding topic of a message queue at a data broker may indicate that a new key is going to be used shortly. This out-of-band message (KEY READY) may facilitate horizontal scalability and may increase quality of service, for at least the reasons described above. However, such a message, or even a broker 3550, may not be necessary in all use cases.

Moreover, in some embodiments, announcement of a KEY READY message may further include a separate cryptographic key to be used to decrypt an encrypted cryptographic key needed to decrypt a payload, for example. Additionally, in some embodiments, as a potential improvement to quality of service, the separate cryptographic key to be used to decrypt the encrypted cryptographic key may be included in a subset of payloads 3526 or 3528, for example. Including cryptographic keys with some payloads may be considered a form of out-of-band messaging.

Cryptographic keys needed to decrypt encrypted payloads may thus be encrypted by other keys exchanged out of band, so that the cryptographic keys needed to decrypt the encrypted payloads may be securely stored and shared, e.g., by traditional databases, smart contracts, or other means that are not completely private. Unlike the encrypted keys, the cryptographic keys used to decrypt the encrypted keys may, in some embodiments, not be stored anywhere other than the publisher edge device 3510. Cryptographic keys used to decrypt encrypted keys may be resent at a configurable frequency, further allowing for more secure, more robust delivery of cryptographic keys over varied channels, conferring further benefits and advantages over conventional techniques.

At this time, the subscribers may ask proxy 3520 (or a separate proxy node 3540, in some embodiments) for the new encrypted key that may be stored but not in use yet. Proxy node 3540 may be a separate, optional node as part of the same proxy service provided by proxy 3520. For purposes of FIG. 35, items 3520 and 3540 may be used interchangeably, and proxy node 3540 may be the same or equivalent to proxy 3520. Additionally, or alternatively, proxy node 3540 may be part of a separate proxy service.

The new encrypted key may next be given to the subscribers if the subscribers, based on smart contract status: 1) are granted and 2) have sufficient credit, according to some embodiments. However, such functionality may, in other embodiments, be implemented using database solutions not necessarily tied to blockchain or smart-contract implementations.

For a duration of time, the payload may then be sent by edge device 3510 to broker 3550, encrypted using the previous key. After the duration of time, the payload sent by edge device 3510 to broker 3550 may then be encrypted using the new key.

Figure 36:
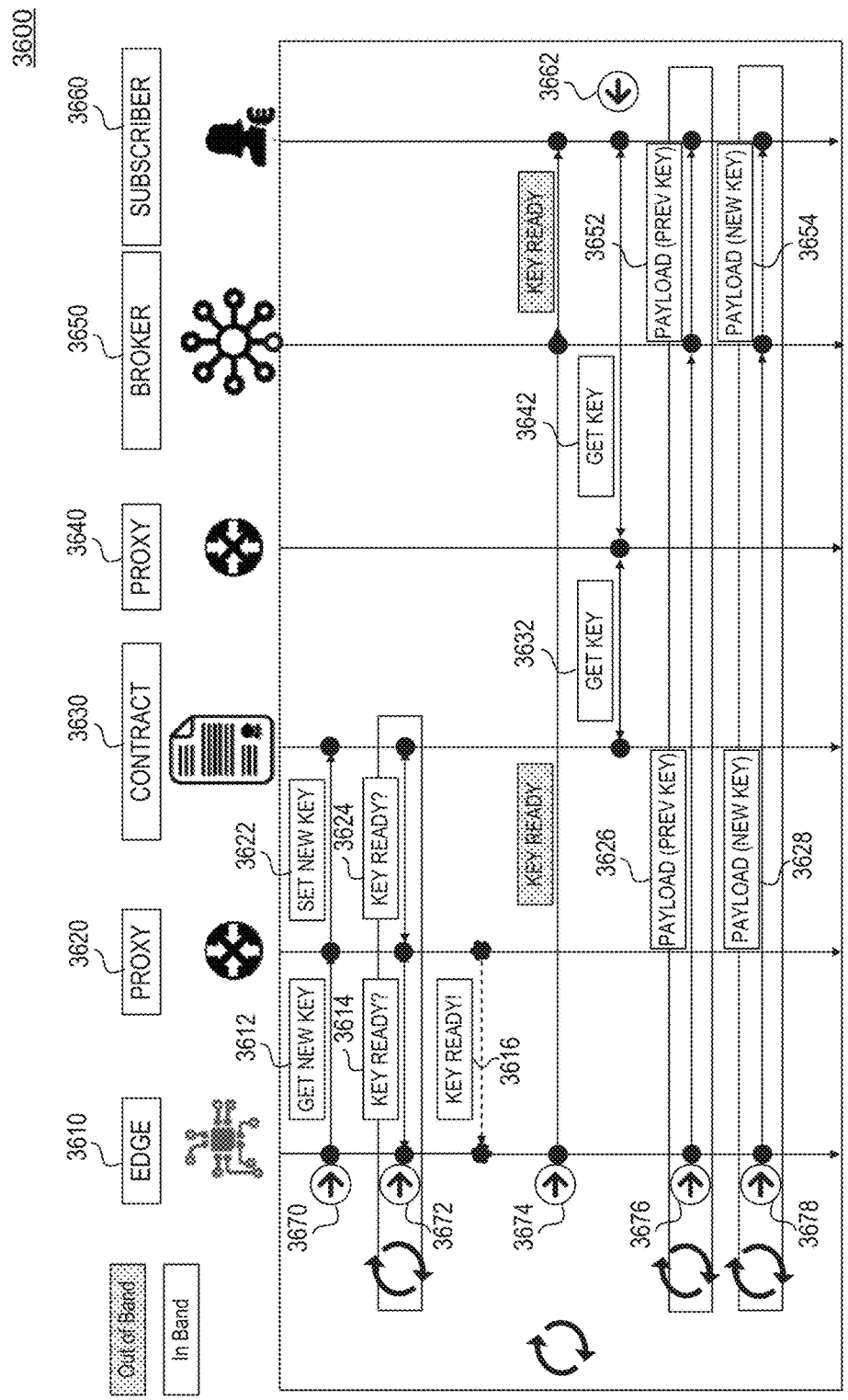
FIG. 36 depicts a process flow diagram of a system implementing a protocol for implementing DOP as an overlay network using constrained edge devices, according to some embodiments.

FIG. 36 shows a process flow diagram of a system implementing a protocol for implementing DOP as an overlay network using constrained edge devices, e.g., in which edge devices may not include hardware and software capable of generating cryptographic keys. In an embodiment, at 3670, edge device 3610, at a given frequency, may send 3612 a request for a new key to proxy 3620. In some embodiments, a packet containing the request for a new key may also contain an integer representing the number of bytes that have been encrypted up to that point; this integer may be stored in a smart contract or other storage means, and may allow for data-volume-based rating models, for example.

Proxy 3620 may then calculate a new key. In some embodiments, proxy may store 3622 the new key to the blockchain platform using, e.g., a smart-contract 3630 interface, for example. This embodiment may be applicable in case of constrained edge devices or environments, in which edge devices may not be able to generate new keys using their own hardware, for example. Also, as described elsewhere herein, blockchain and smart-contract technology may not be required for all use cases—database-oriented solutions may suffice, in some embodiments, potentially offering advantageous speed where needed.

Edge device 3610 may, at 3672, repeat requesting if the new key has been stored and if it is ready to be used. Edge device 3610 may be required to repeat the request so as to implement edge device 3610 as a data diode without access to incoming traffic. In some embodiments, edge device 3610 may request whether a cryptographic key is ready for use (e.g., using KEY READY request 3614), such as directly checking a smart contract 3530 or via proxy 3620, to check or otherwise query a status of smart contract 3630. Additionally, or alternatively, a database that supports queries for key status may be used instead of or alongside smart contract 3630.

Once the new key has been stored and is ready to be used, edge device 3610 may receive a KEY READY message 3616 from proxy 3620.

Once edge device 3610 knows that the new key is ready, edge device 3610 may, based on a given configuration, in some embodiments, send an out-of-band message to the broker 3650, indicating that a new key is going to be used shortly. This out of band message (KEY READY) may facilitate horizontal scalability and may increase quality of service, for at least the reasons described above. However, such a message as at 3674, or even a broker 3650, may not be necessary in all use cases.

At 3662, subscriber 3660 may ask proxy 3640 for the new key (GET KEY request 3642), which may be stored but not in use yet, e.g., by checking smart contract 3630 (GET KEY request 3632). The new key may be provided to subscriber 3660 if subscriber 3660, based on smart contract status: is 1) granted and 2) has sufficient credit, according to some embodiments. However, such functionality may, in other embodiments, be implemented using database solutions not necessarily tied to blockchain or smart-contract implementations.

Based on a given configuration, at 3676, the payload may, for a duration of time, be sent 3626 by edge device 3610 to broker 3650 and may be encrypted using the previous key 3652, for example.

After a duration of time (e.g., set by a configurable frequency), at 3678, the payload sent 3628 by edge device 3610 to broker 3650 may be encrypted using the new key 3654. If a subscriber has no access to the new key, that subscriber may lose visibility on subsequent payloads that encrypted using the new key.

Figure 37A:
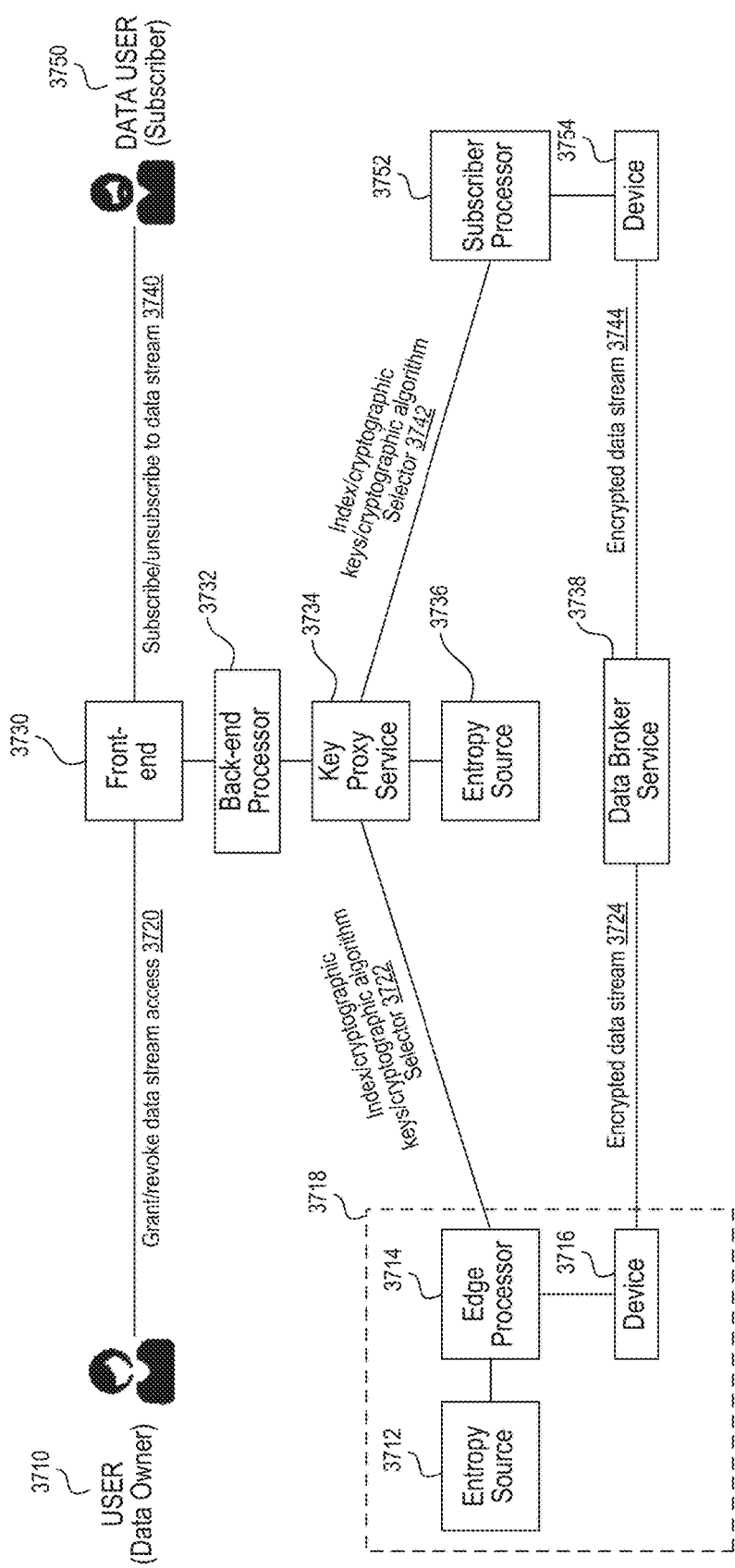
FIGS. 37A-D depict example use cases of a DOP system, according to some embodiments.
Figure 37B:
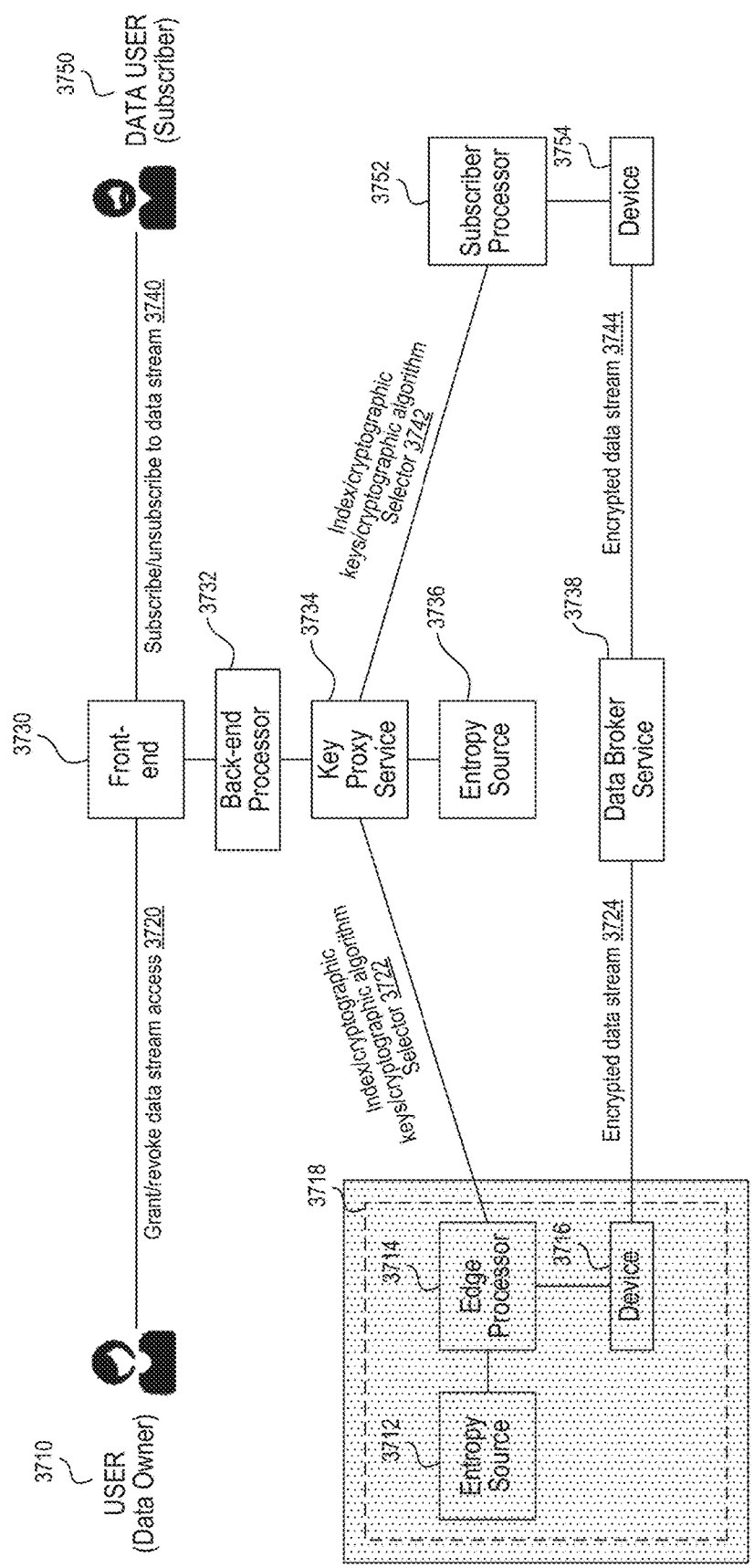
Figure 37C:
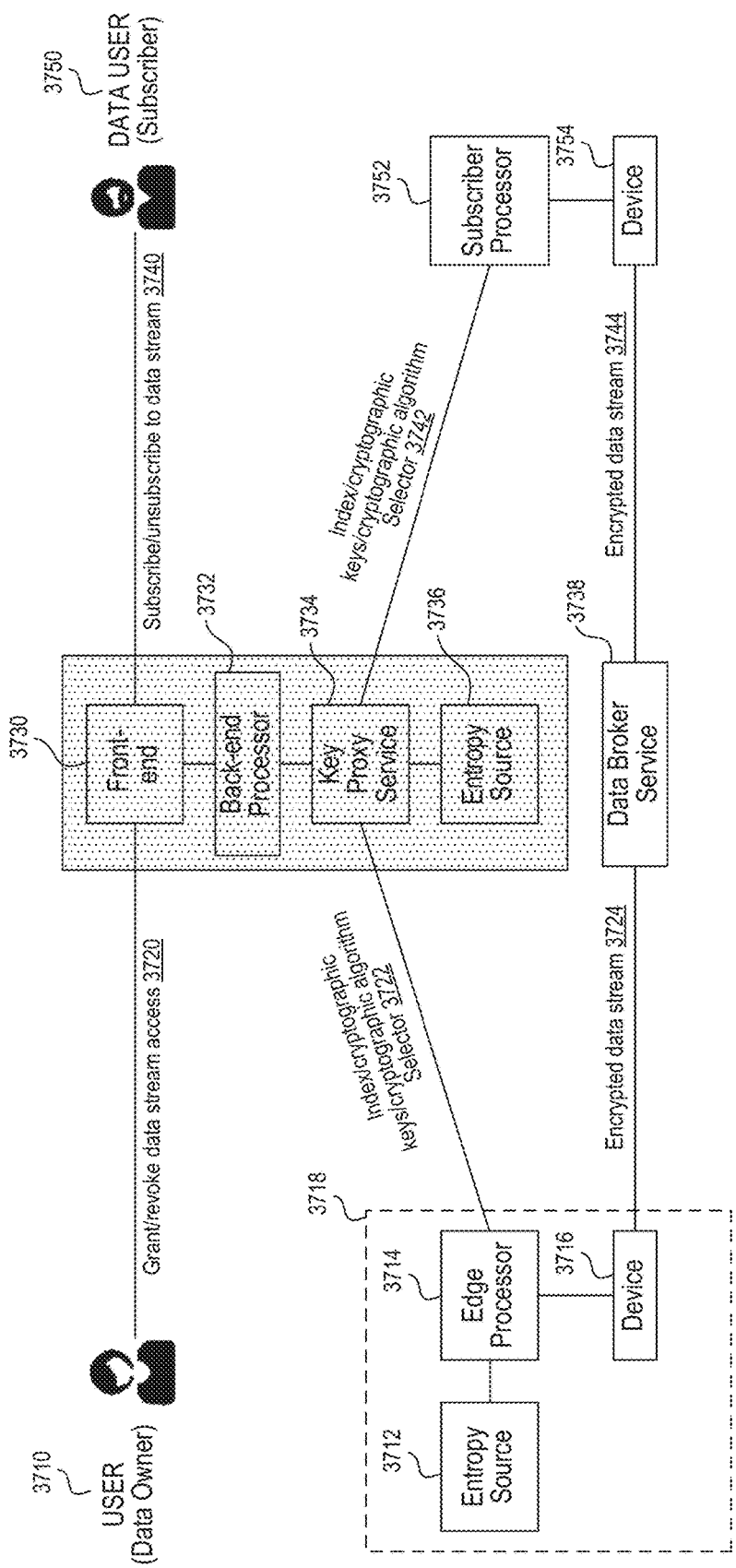
Figure 37D:
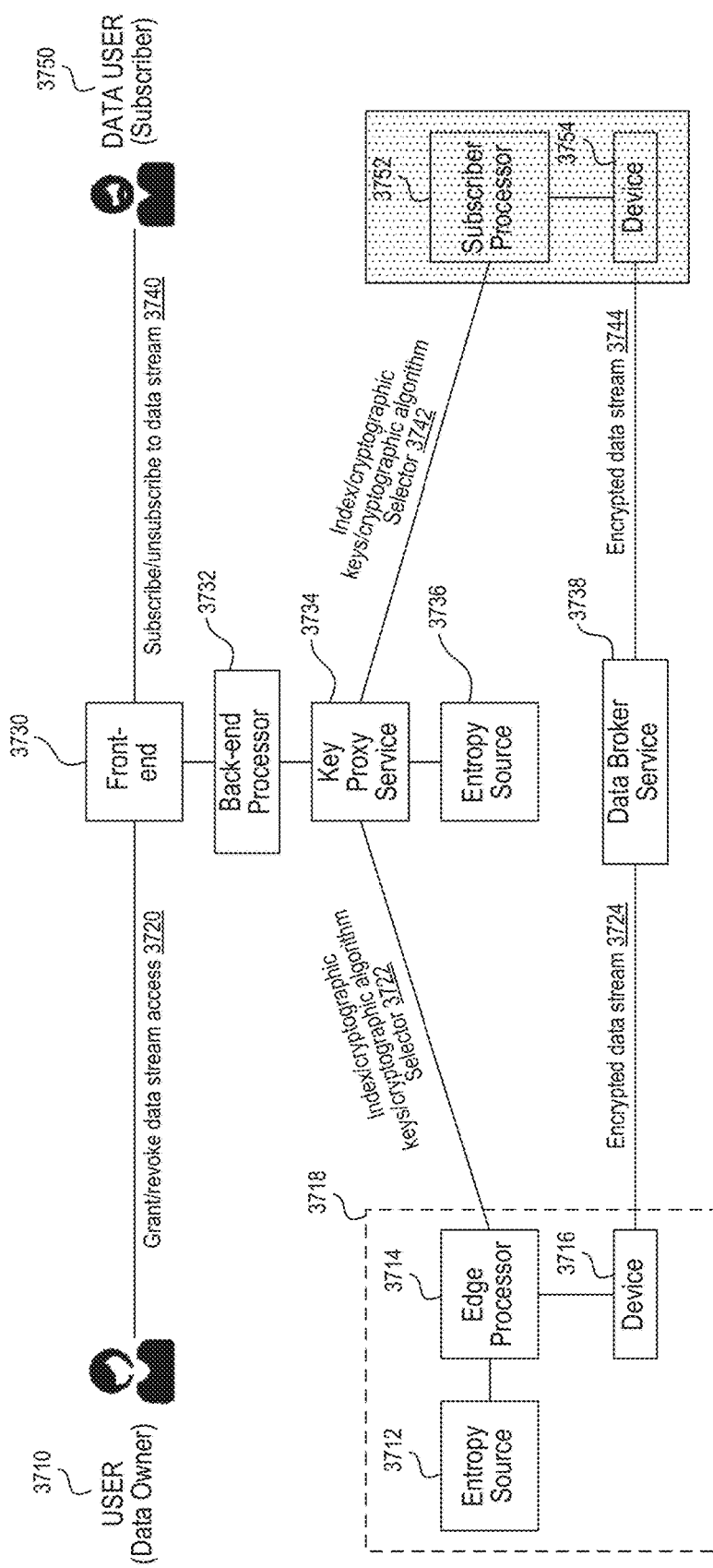
Figure 38A:
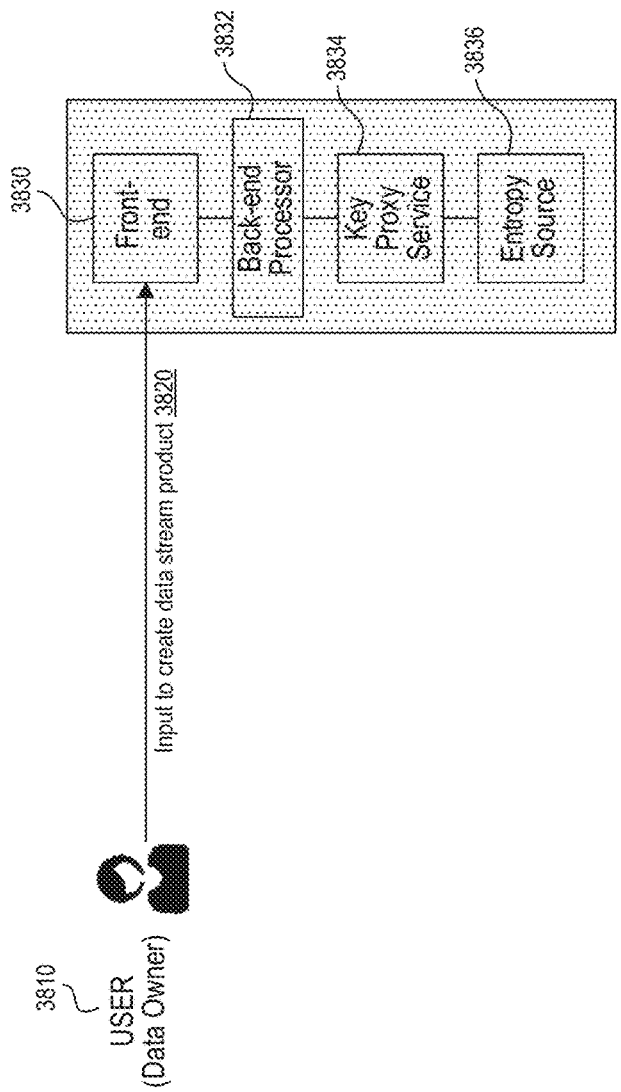
FIGS. 38A-H depict example key-revocation use cases of a DOP system, according to some embodiments.
Figure 38B:
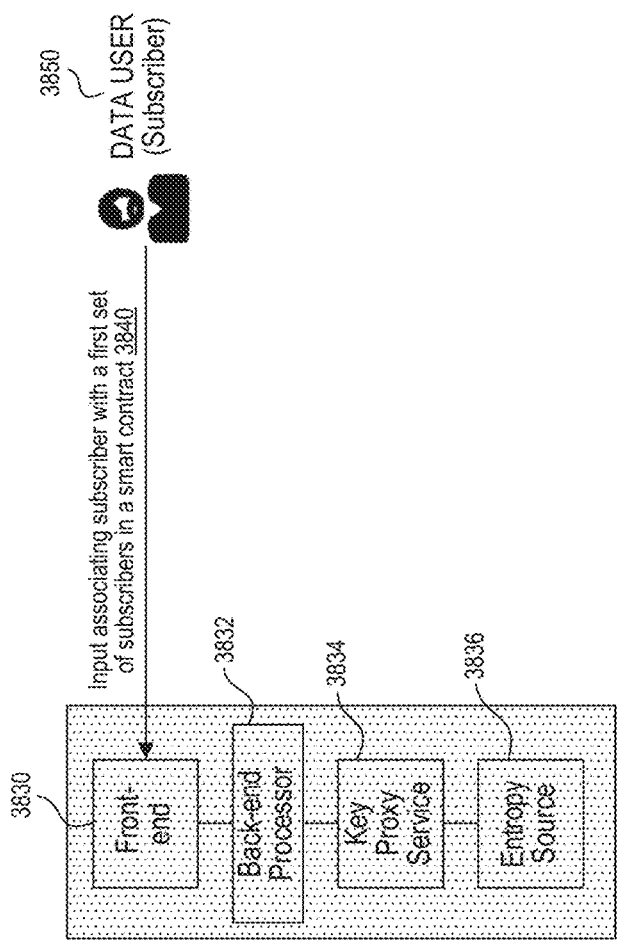
Figure 38C:
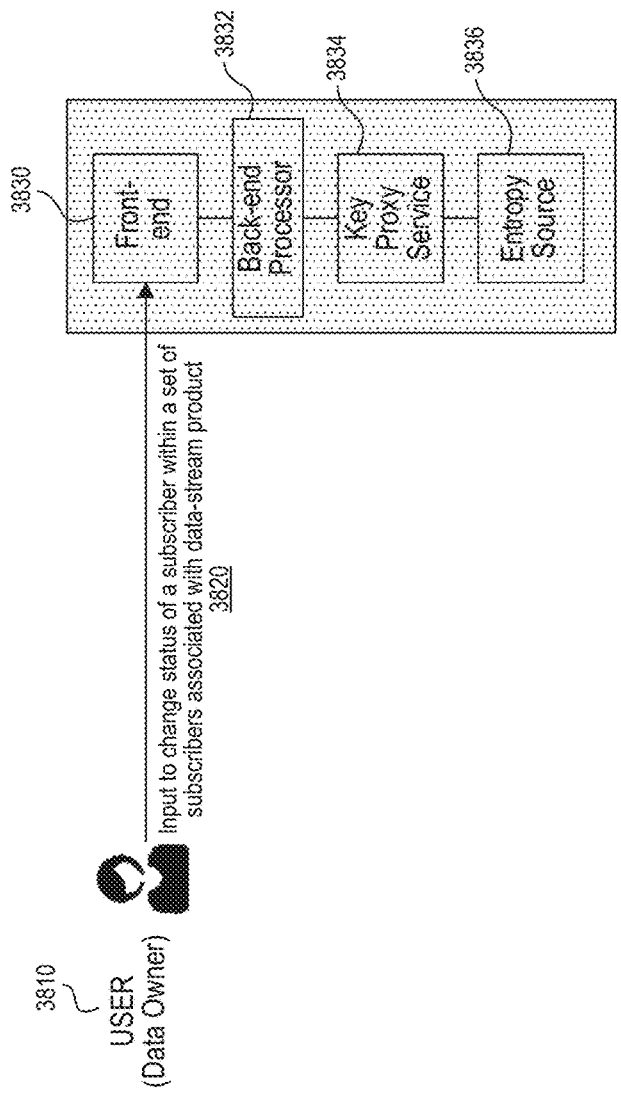
Figure 38D:
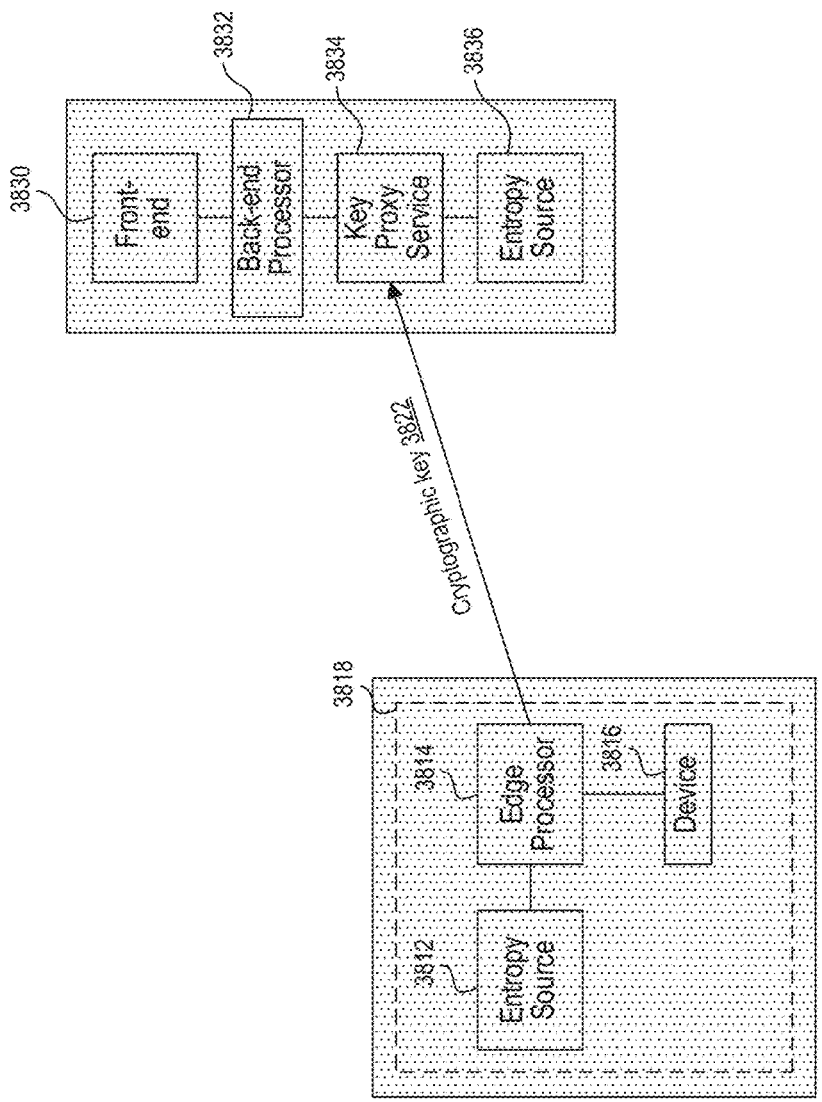
Figure 38E:
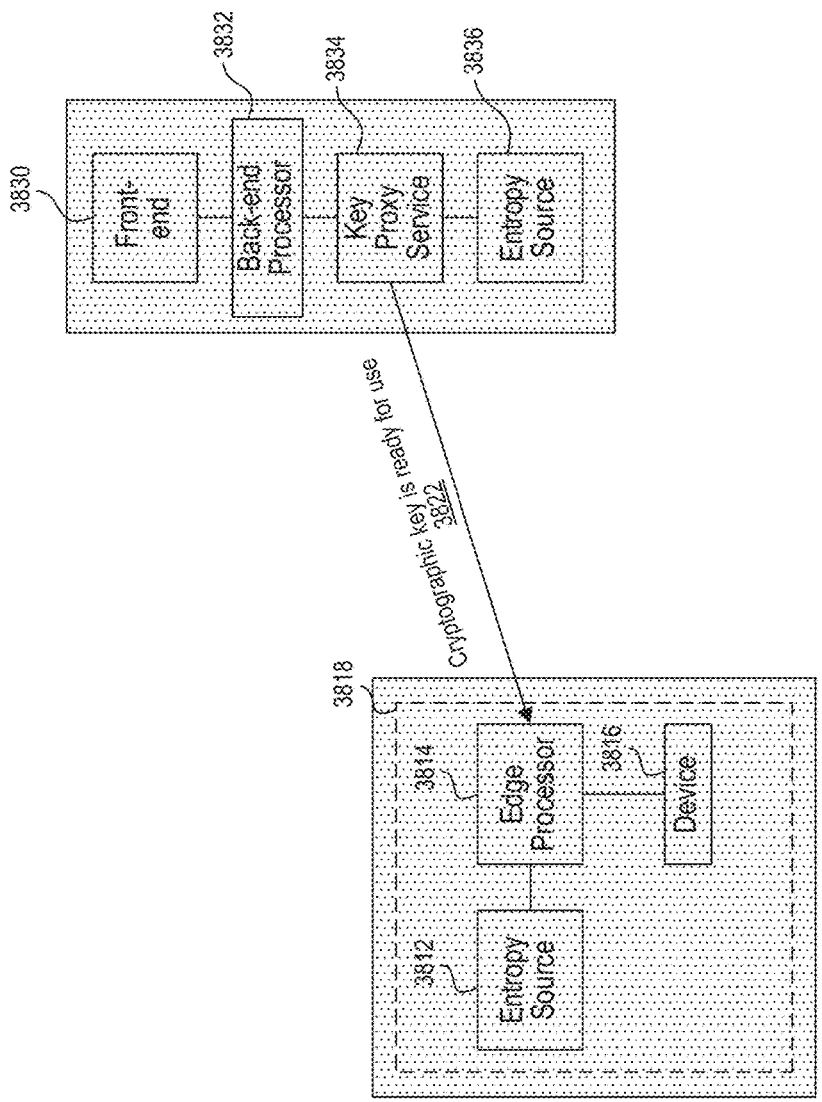
Figure 38F:
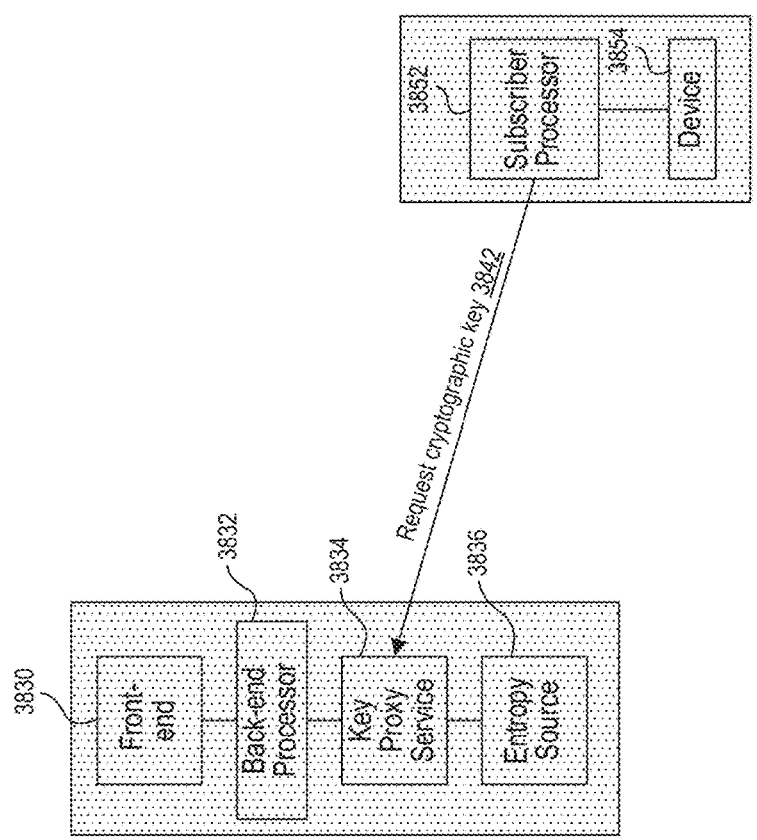
Figure 38G:
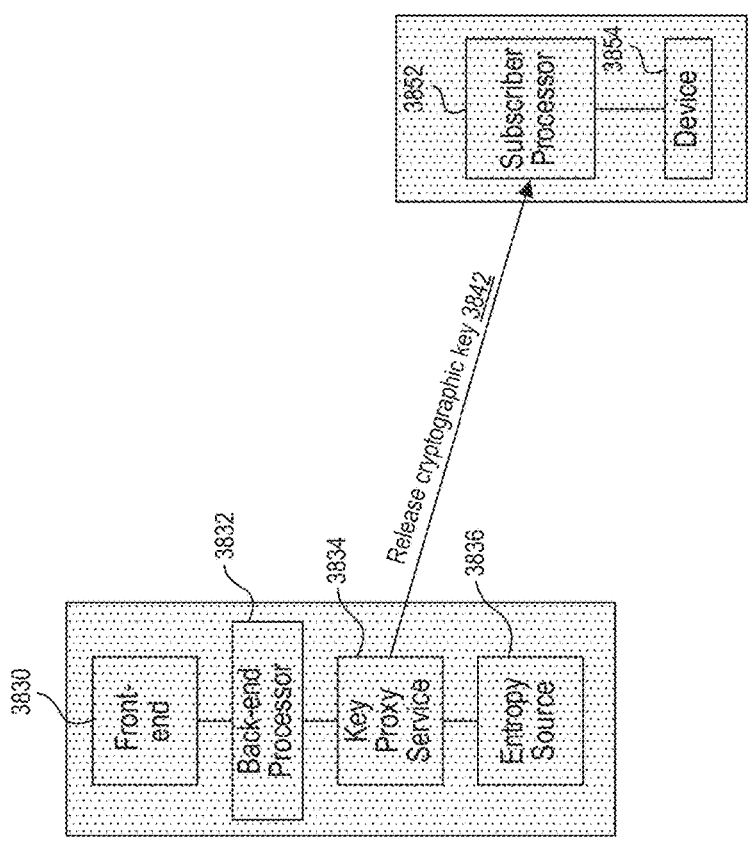
Figure 38H:
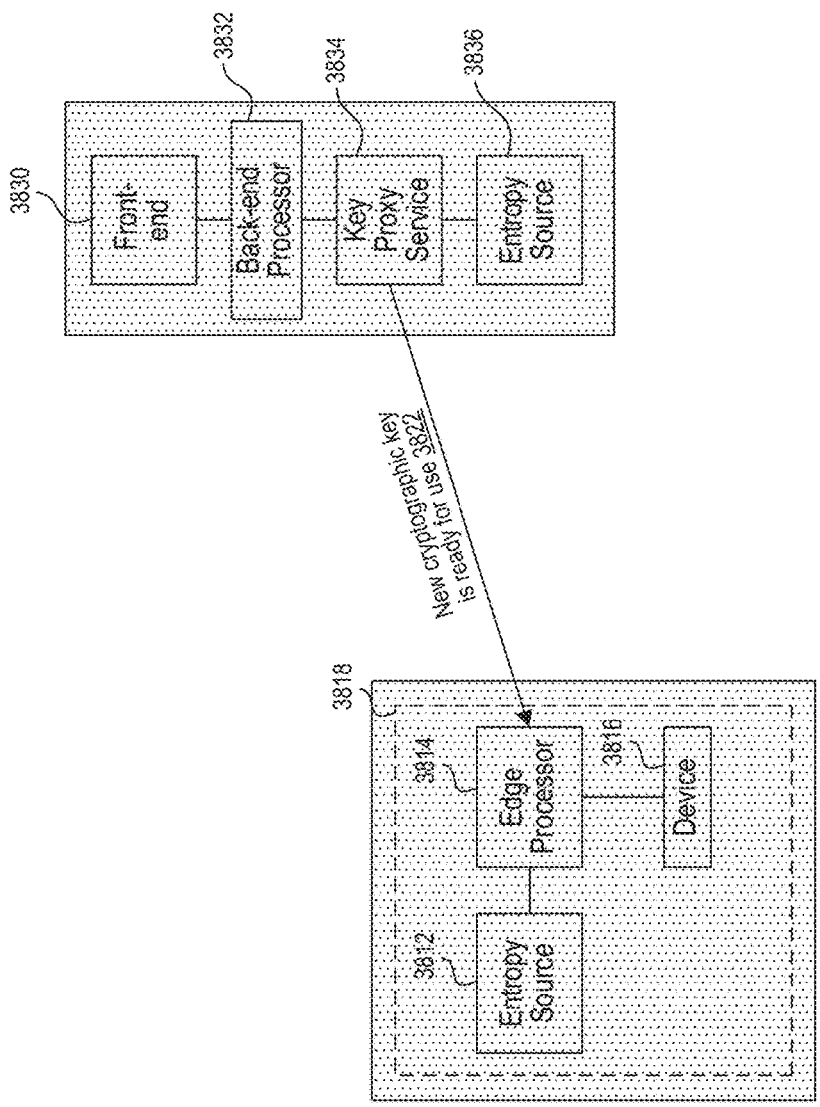

FIGS. 37A-D depict example use cases of a DOP system, according to some embodiments. FIG. 37A provides an overview of a non-limiting example system.

In accordance with other examples described herein, user 3710 (data owner) may represent a publisher, e.g., an owner or user of at least one edge device 3718 (publisher device) that may be used to collect and publish data points, to be optionally encrypted, according to some embodiments. Edge device 3718 may include at least one edge processor 3714 and communication device 3716, and optionally at least one entropy source 3712, which may be equipped on-board a discrete package of the edge device 3718 (see, for example, the highlighted portion of FIG. 37B).

A subscriber 3750 (data user) may seek to subscribe or unsubscribe 3740 to an encrypted data stream 3724 published by data owner 3710. Subscriber 3750 may receive the encrypted data stream 3724 (or 3744, optionally via a data-broker service 3738) at a subscriber communication device 3754 and/or subscriber processor 3752 (see, for example, the highlighted portion of FIG. 37D). However, in order to decrypt any payload data in the encrypted data stream 3724 or 3744, subscriber processor 3752 may require access to the publisher's cryptographic key at a given time for which the subscriber 3750 seeks access, e.g., by a request via a front-end 3730 (optionally via a web browser, hybrid or native web application, and/or application programming interface (API), etc.). Publisher (user 3710) may grant or revoke data stream access 3720, by interacting with front-end 3730.

Any requests for access from a subscriber 3750 or actions to grant or revoke access from a user 3710 may be processed by at least one back-end processor 3732, optionally connecting to a key-proxy service 3734 or directly to edge devices (e.g., edge device 3718, edge processor 3714, subscriber processor 3752, etc.). Optionally, back-end processor 3732 or key-proxy service 3734 may have at least one entropy source by which to provide random seed data for cryptographic key generation, either at the back-end processor 3732 or at edge processor 3714, according to some embodiments.

This intermediate stack of components 3730-3736, including front end 3730, back-end processor 3732, key proxy service 3734, and entropy source 3736 (see, for example, the highlighted portion of FIG. 37C) may optionally be centralized, distributed, or otherwise decentralized. Any data-broker service 3738 is also optional, as are key-proxy service 3734 and entropy source 3736, according to some embodiments. Thus, in some example use cases per other embodiments, edge device 3718 of user 3710 may interact more directly with any number of subscriber processors 3752 or subscriber communication devices 3754 for any number of subscribers such as subscriber 3750. The flow diagrams depicted in FIGS. 35 and 36 may be implement in the system shown in FIGS. 37A-D, according to some embodiments.

FIGS. 38A-H depict example key-revocation use cases of a DOP system, according to some embodiments using smart contracts, for example.

As with FIGS. 37A-D, in accordance with other examples described herein, user 3810 (data owner) may represent a publisher, e.g., an owner or user of at least one edge device 3818 (publisher device) that may be used to collect and publish data points, to be optionally encrypted, according to some embodiments. Edge device 3818 may include at least one edge processor 3814 and communication device 3816, and optionally at least one entropy source 3812 on-board a discrete package of the edge device 3818.

A subscriber 3850 (data user) may seek to subscribe or unsubscribe, as with 3740, to an encrypted data stream 3824 published by data owner 3810. Additionally, or alternatively, subscriber 3850 may provide input associating subscriber 3850 with a first set of subscribers in a smart contract 3840, for example. Subscriber 3850 may receive the encrypted data stream 3824 (or 3844, optionally via a data-broker service 3838) at a subscriber communication device 3854 and/or subscriber processor 3852. However, in order to decrypt any payload data in the encrypted data stream 3824 or 3844, subscriber processor 3852 may require access to the publisher's cryptographic key at a given time for which the subscriber 3850 seeks access, e.g., by a request via a front-end 3830 (optionally via a web browser, hybrid or native web application, and/or application programming interface (API), etc.). Publisher (user 3810) may grant or revoke data stream access as with 3720. Additionally, or alternatively, user 3810 may provide input to change status of any number of subscribers within a set of subscribers associated with a data-stream product 3820 (e.g., via smart contract), by interacting with front-end 3830.

Any requests for access from a subscriber 3850 or actions to grant or revoke access from a user 3810 may be processed by at least one back-end processor 3832, optionally connecting to a key-proxy service 3834 or directly to edge devices (e.g., edge device 3818, edge processor 3814, subscriber processor 3852, etc.). An action to revoke access permission to a selected subscriber, for example, may result in a second set of subscribers that excludes the selected subscriber. Optionally, back-end processor 3832 or key-proxy service 3834 may have at least one entropy source by which to provide random seed data for cryptographic key generation, either at the back-end processor 3832 or at edge processor 3814, according to some embodiments.

This intermediate stack of components 3730-3738 may optionally be centralized, distributed, or otherwise decentralized. Any data-broker service 3838 is optional, as are key-proxy service 3834 and entropy source 3836, according to some embodiments. Thus, in some example use cases per other embodiments, edge device 3818 of user 3810 may interact more directly with any number of subscriber processors 3852 or subscriber communication devices 3854 for any number of subscribers such as subscriber 3850. The flow diagrams depicted in FIGS. 35 and 36 may be implement in the system shown in FIGS. 38A-H, according to some embodiments.

FIGS. 39A-E depict example key-revocation use cases of a DOP system, according to some embodiments.

As with FIGS. 37A-D, in accordance with other examples described herein, user (data owner) may represent a publisher, e.g., an owner or user of at least one edge device 3918 (publisher device) that may be used to collect and publish data points, to be optionally encrypted, according to some embodiments. Edge device 3918 may include at least one edge processor 3914 and communication device 3916, and optionally at least one entropy source 3912 on-board a discrete package of the edge device 3918. The flow diagrams depicted in FIGS. 35 and 36 may be implement in the system shown in FIGS. 39A-E, according to some embodiments.

A subscriber (data user) may seek to subscribe or unsubscribe, as with 3740, to an encrypted data stream 3924 published by data owner. Additionally, or alternatively, subscriber may provide input associating subscriber with a first set of subscribers in a smart contract 3940, for example. Subscriber may receive the encrypted data stream 3924 (or 3944, optionally via a data-broker service 3938) at a subscriber communication device 3954 and/or subscriber processor 3952. However, in order to decrypt any payload data in the encrypted data stream 3924 or 3944, subscriber processor 3952 may require access to the publisher's cryptographic key at a given time for which the subscriber seeks access, e.g., by a request via a front-end 3930 (optionally via a web browser, hybrid or native web application, and/or application programming interface (API), etc.). Publisher (user) may grant or revoke data stream access as with 3720. Additionally, or alternatively, user may provide input to change status of any number of subscribers within a set of subscribers associated with a data-stream product 3920 (e.g., via smart contract), by interacting with a front-end service, for example.

Any requests for access from a subscriber or actions to grant or revoke access from a user may be processed by at least one back-end processor 3932, optionally connecting to a key-proxy service 3934 or directly to edge devices (e.g., edge device 3918, edge processor 3914, subscriber processor 3952, etc.). Optionally, back-end processor 3932 or key-proxy service 3934 may have at least one entropy source by which to provide random seed data for cryptographic key generation, either at the back-end processor 3932 or at edge processor 3914, according to some embodiments.

Any data-broker service 3938 is optional. Thus, in some example use cases per other embodiments, edge device 3918 of user may interact more directly with any number of subscriber processors 3952 or subscriber communication devices 3954 for any number of subscribers such as subscriber.

As described particularly with respect to items 3939*a*-*e*, key distribution, notification, revocation, and replacement of keys may be performed by an edge device 3918 to subscriber devices (e.g., subscriber processor 3952 and/or subscriber communication device 3954), directly, with or without any intervening services (back-end processor, key-proxy service, data-broker service, etc.) managing such communication of keys or notifications. Such communication may be out-of-band communication via a separate overlay network or side channel, for example, irrespective of any back-end, proxy service, or data broker, in some embodiments.

According to an example use case, out-of-band data and/or imperatives may be carried within a same channel used for any other payload. Bundling or unbundling may be performed by various communication stacks. A payload may be inserted into an envelope containing any other imperative necessary to the DOP. In this way, at least from an operative point of view, DOP implementations may thus further avoid introducing special requirements related to secondary communication channels, for example.

Figure 39A:
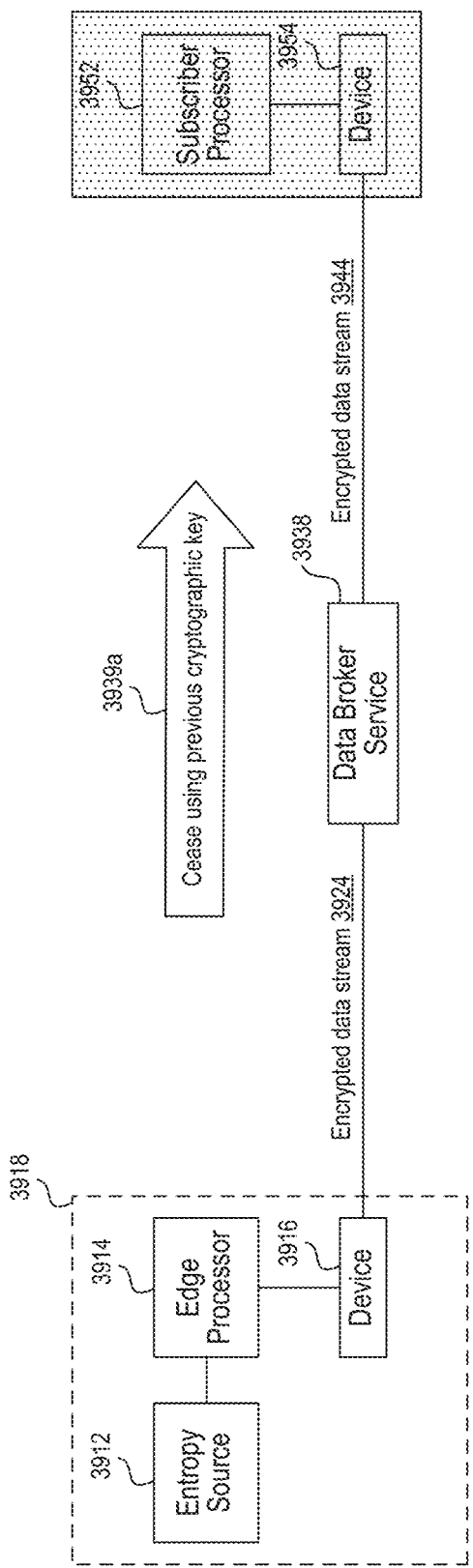
FIGS. 39A-E depict example key-revocation use cases of a DOP system, according to some embodiments.

Thus, for example, as shown with respect to 3939*a* of FIG. 39A, edge device 3918 may transmit or emit a notification to cease using a previous cryptographic key. This notification may be transmitted via communication device 3916 or via other means coupled with edge processor 3914, for example. Such a notification of 3939*a* may inform subscribers with continued access granted that a cryptographic key is changing such that the new cryptographic key will be needed for continued access to a stream.

Figure 39B:
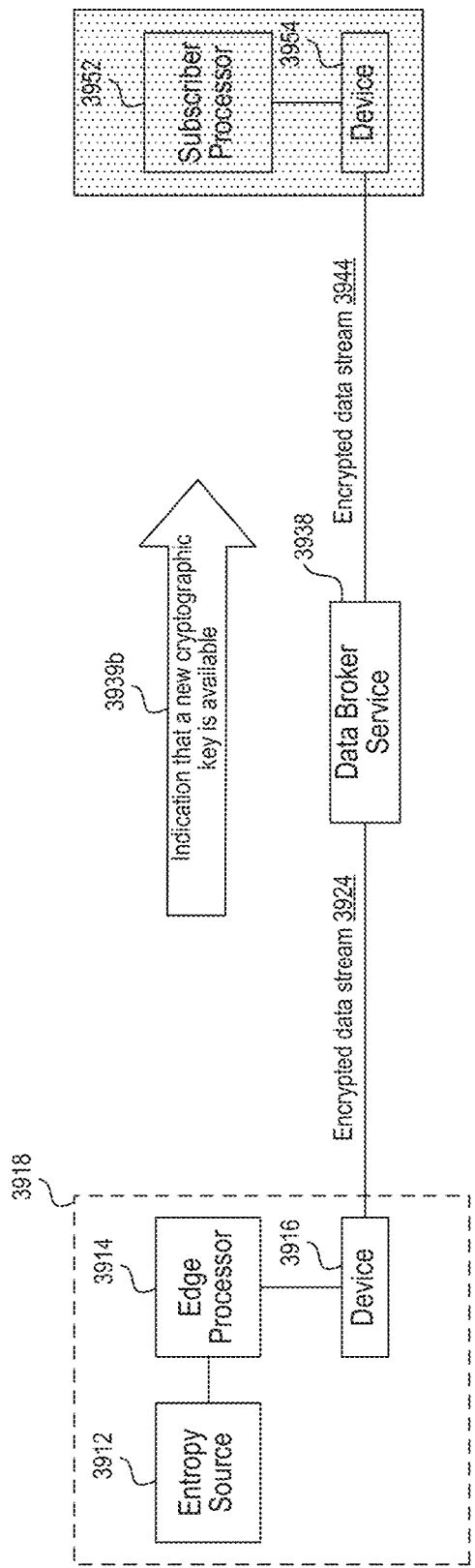

As shown with respect to 3939*b* of FIG. 39B, edge device 3918 may transmit, in similar fashion as with 3939*a*, an indication that a new cryptographic key is available, at least to subscribers with continued access granted. Subscribers for whom access is revoked or not otherwise granted may or may not receive notification of new cryptographic keys, but in any event will not receive the next cryptographic key to replace the previous cryptographic key from edge device 3918, as transmitted in 3939*c*, as shown in FIG. 39C.

In some embodiments, edge device 3918 may not know who any subscribers are, with such subscriber information being managed in, e.g., a smart contract, database, broker, or other external data store. As a result, announcements or similar indications from the edge device 3918 may be broadcast to any or all subscribers, regardless of whether a publisher has granted or revoked access to a particular subscriber. Thus, subscribers whose access is not granted may still receive announcements from edge device 3918, but in that case, subscribers without access granted may then be unable to receive new cryptographic keys from a corresponding back-end service, so that such subscribers may not decrypt encrypted data payloads. Subscribers to whom access is granted may access the latest keys via a proxy service and/or a data broker service, for example, where keys may themselves be encrypted.

Figure 39C:
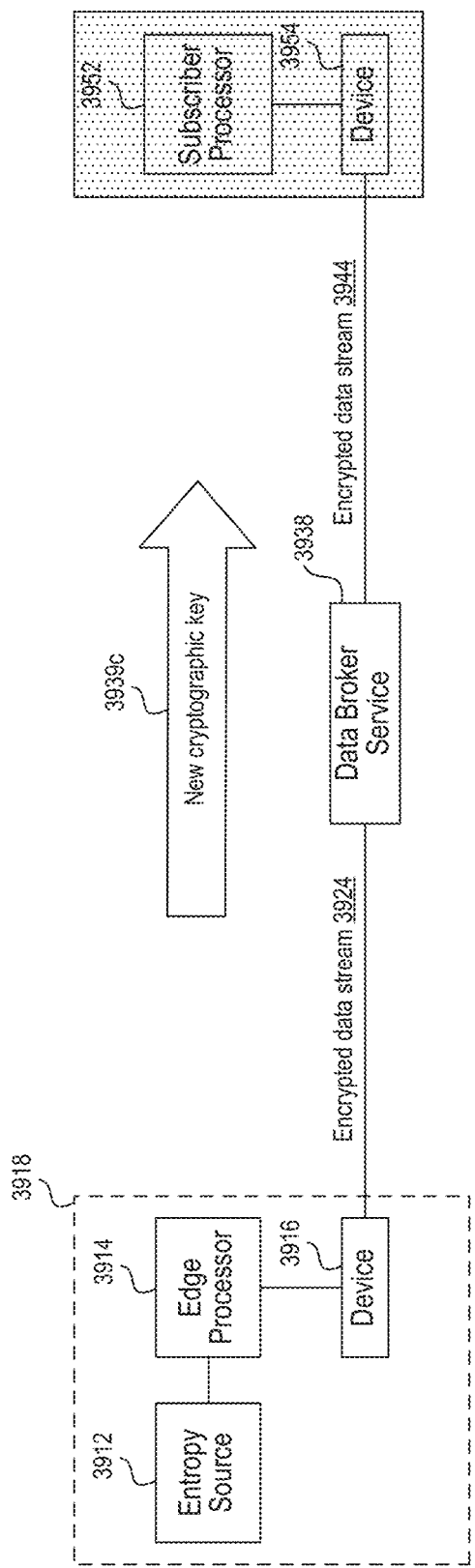

Thus, as shown in FIG. 39C with respect to 3939*c*, a new cryptographic key may be transmitted to subscribers. Edge processor 3914 may be equipped to allow a publisher manage sets of subscribers for whom data-stream access is granted or revoked, according to some embodiments. Each edge device 3918 may, in some embodiments, include its own front-end or similar user interface. Additionally, or alternatively, a separate front-end service may be used to control subscriptions (access grants/revocations, etc.) by a data owner.

In some embodiments, edge device 3918 may not know who any subscribers are, with such subscriber information being managed in, e.g., a smart contract, database, broker, or other external data store. As a result, announcements or similar indications from the edge device 3918 may be broadcast to any or all subscribers, regardless of whether a publisher has granted or revoked access to a particular subscriber. Thus, subscribers whose access is not granted may still receive announcements from edge device 3918, but in that case, subscribers without access granted may then be unable to receive new cryptographic keys from a corresponding back-end service, so that such subscribers may not decrypt encrypted data payloads. Subscribers to whom access is granted may access the latest keys via a proxy service and/or a data broker service, for example, where keys may themselves be encrypted.

Figure 39D:
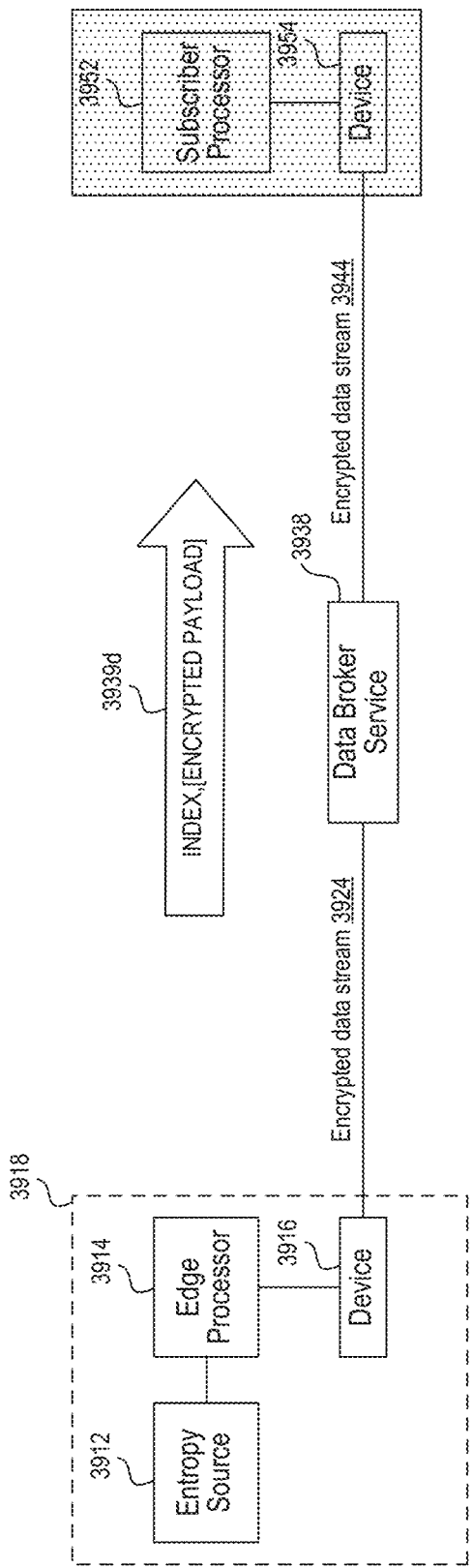
Figure 39E:
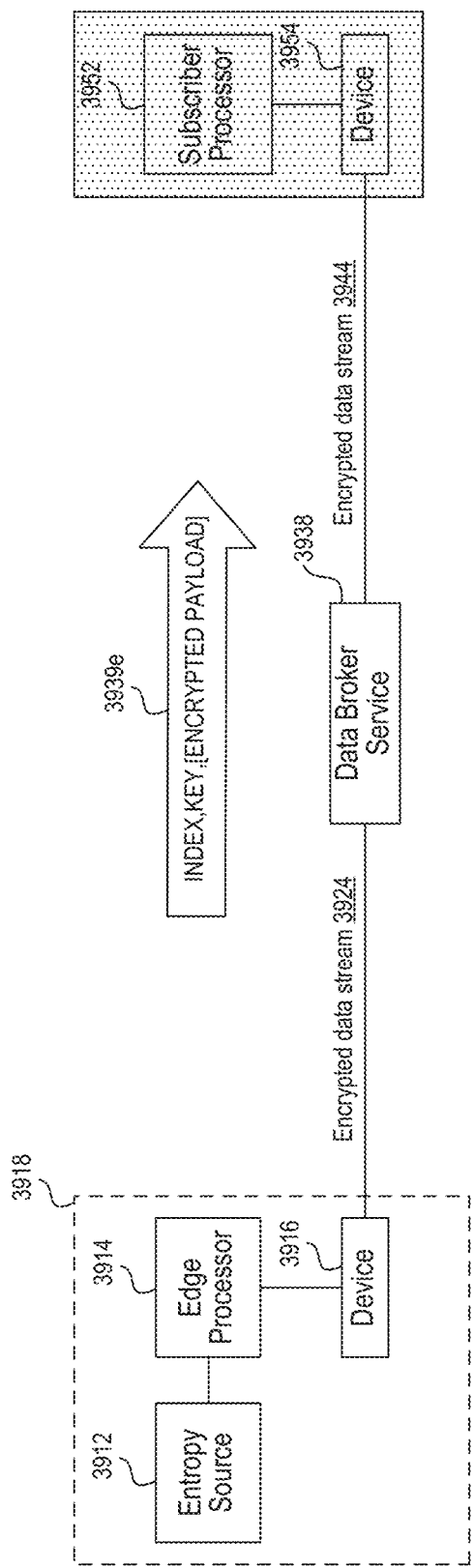

Per FIG. 39D, in some embodiments in which a separate service (e.g., key-proxy service, data-broker service, blockchain, smart contract, etc.) may be used to store and/or otherwise control access to keys, keys may be sent directly to the separate service and indexed, and edge device 3918 may then transmit only an index, optionally with an encrypted payload, to some or all subscribers and/or optionally to a data-broker service, for example, as shown with respect to 3939d. Additionally, in some embodiments, the cryptographic key may also be included in this transmission, as shown with respect to 3939e of FIG. 39E.

Reasons for such system interactions are described throughout the present disclosure, and implementation details for such an interaction, from an edge-device, are further described below, such as with respect to FIG. 40.

Figure 40:
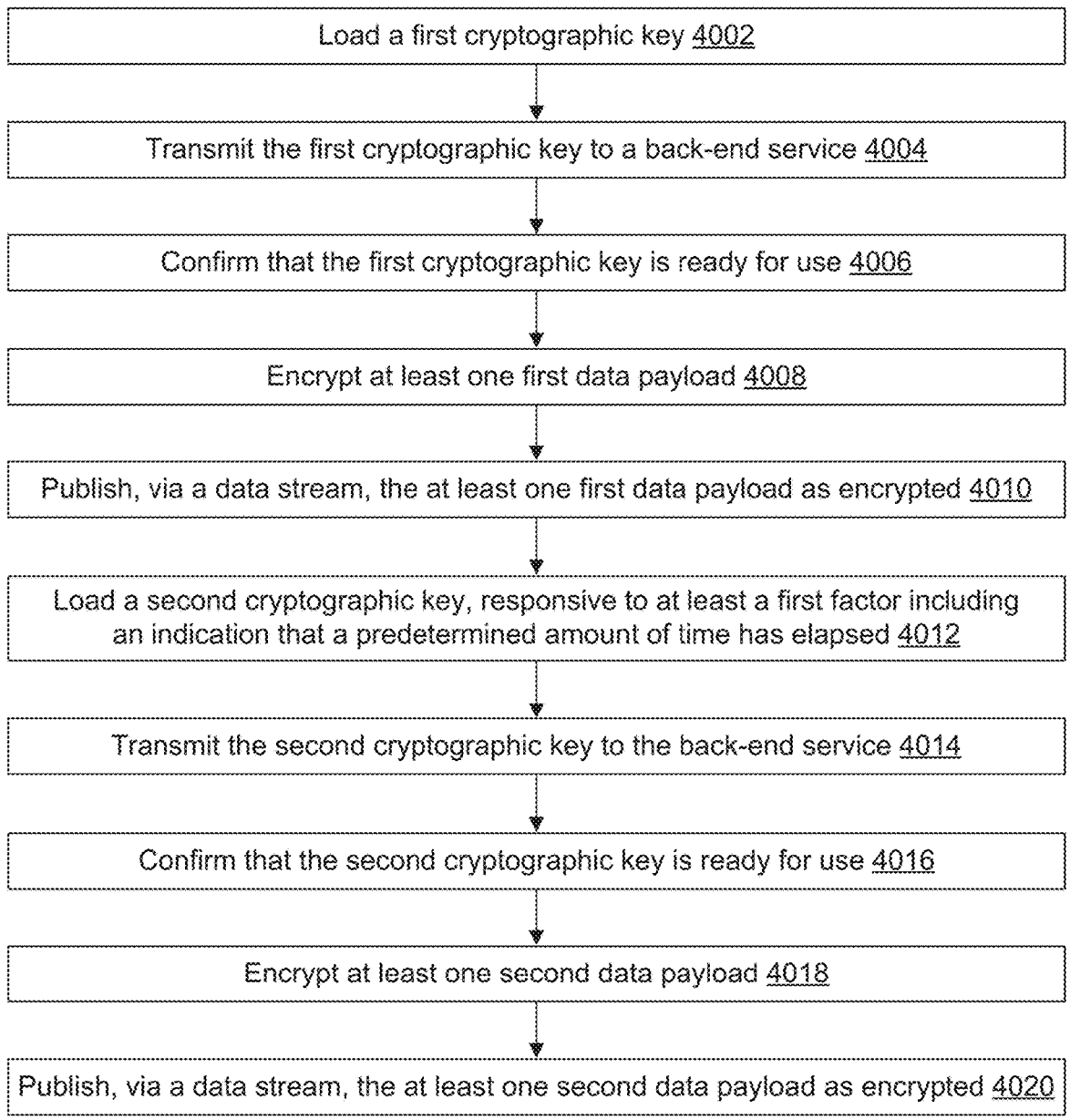
FIG. 40 is a flowchart illustrating a process implementing some of the enhanced techniques described herein, according to some embodiments.

FIG. 40 is a flowchart illustrating a method 4000 for operation of an example apparatus in accordance with the enhanced techniques described herein, according to some embodiments. Method 4000 may be performed by processing logic that may comprise hardware (e.g., circuitry, dedicated logic, programmable logic, microcode, etc.), software (e.g., instructions executing on a processing device), or a combination thereof. Not all steps of method 4000 may be needed in all cases to perform the enhanced techniques disclosed herein. Further, some steps of method 4000 may be performed simultaneously, or in a different order from that shown in FIG. 40, as will be understood by a person of ordinary skill in the art.

Method 4000 shall be described with reference to FIGS. 1-41. However, method 4000 is not limited only to those example embodiments. The steps of method 4000 may be performed by at least one computer processor coupled to at least one memory device. An exemplary processor and memory device(s) are described below with respect to FIG. 41.

Figure 41:
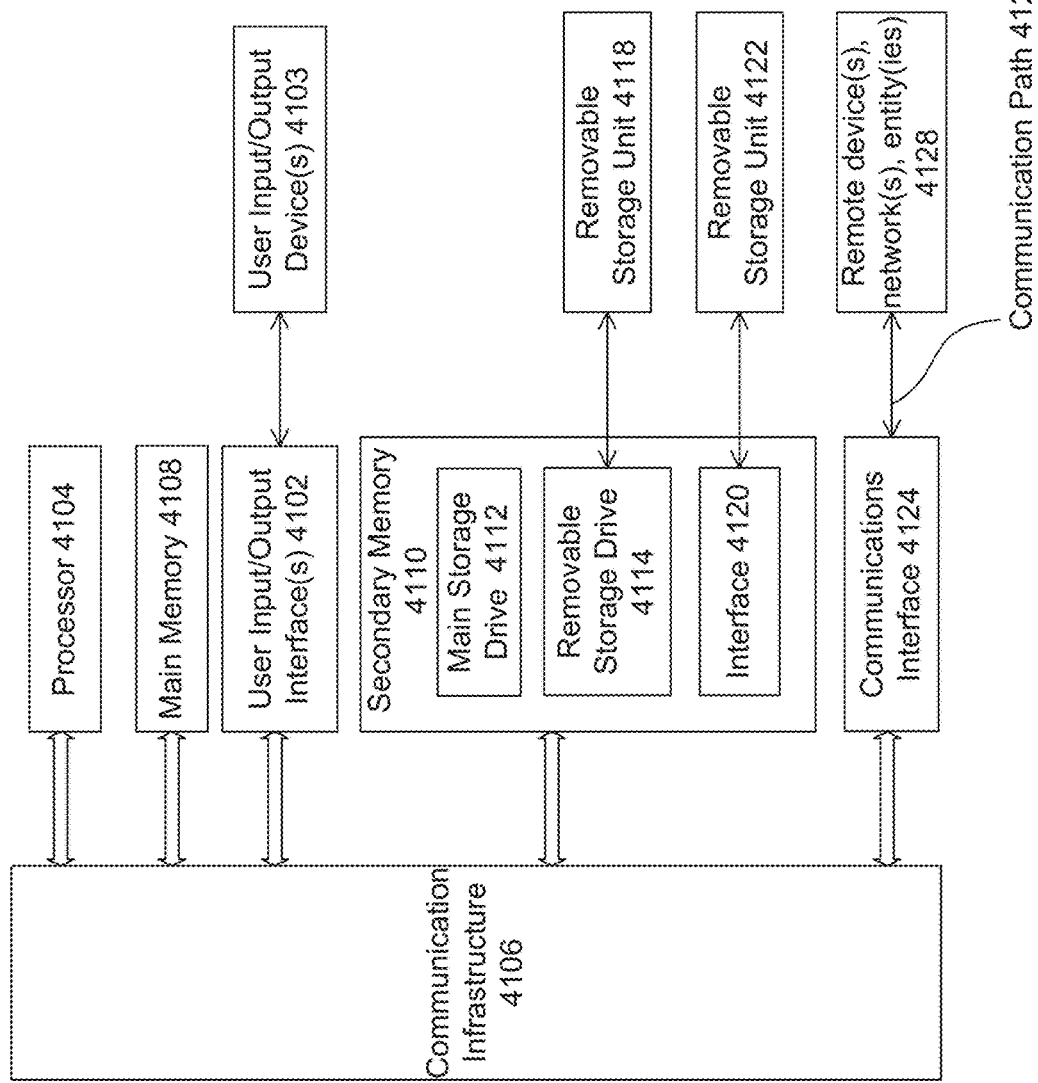
FIG. 41 is a block diagram of an example computer system useful for implementing various embodiments.

In some embodiments, method 4000 may be performed by at least one edge device in conjunction with any of the protocols and/or systems demonstrated in any of FIGS. 35-39E, which may further include at least one processor and memory such as those of FIG. 41. Moreover, similar processes as method 4000 may be used to operate a publisher edge device that may be involved with any of the use cases shown in FIGS. 1-34, for example. While this example, for illustrative purposes, includes operations for use with a back-end service, e.g., a key-proxy service, such operations are optional for other embodiments that may involve direct communication between publisher devices and subscriber devices, for example.

In 4002, at least one processor 4104 may be configured to load a first cryptographic key. To load the first cryptographic key, processor 4104 may copy all or part of the first cryptographic key, in at least one serial or parallel operation, from at least one device (which may be on-board processor 4104, in some embodiments) into at least one memory device, for example.

Further with respect to 4002, the first cryptographic key may be loaded, for example, from an external device, which may, in some embodiments, include accelerated hardware tuned for enhanced cryptographic processing. Additionally, or alternatively, the external device may include at least one entropy source, which may not be present or readily usable on the same apparatus (e.g., edge device) as processor 4104. Such a use case may be referred to as a constrained-edge use case, such as that shown with respect to FIG. 36.

In some embodiments, the cryptographic key may be loaded as generated on-board the same apparatus (e.g., edge device) as may include processor 4104. In such embodiments, at least one entropy source may be equipped on-board the same apparatus as processor 4104. Additionally, or alternatively, entropy may be sourced from an external device, in some embodiments. Entropy sources may be used to source (pseudo-)random number generators for use with cryptographic key generation. Entropy sources may include, but are not limited to, environmental sensors (different from or the same as any environmental sensors used to feed a data-stream payload for publishing), on-board signals, or any noise generated or detected by the same apparatus as may include processor 4104.

In 4004, processor 4104 may be configured to transmit the first cryptographic key to a back-end service. Additionally, or alternatively, the first cryptographic key may be transmitted directly to one or more subscriber devices, whether or not any back-end service is present or available, according to some embodiments.

A back-end service may be a key-proxy service, for example. A key-proxy service may, in some embodiments, comprise a traditional database, structured or unstructured, which itself may or may not be backed by encrypted storage, for example. The back-end service may be centralized or decentralized, in some embodiments. Additionally, or alternatively, key-proxy service, or a comparable back-end service, may be implemented using a blockchain, which may further implement, in some embodiments, at least one smart contract associated with the key-proxy service and/or specific publishers and/or subscribers directly, according to some embodiments. Other examples of various use cases and implementations for 4004 are described elsewhere herein with respect to the enhanced technology of the present disclosure.

In 4006, processor 4104 may be configured to confirm that the first cryptographic key is ready for use, according to some embodiments. In other embodiments, where a key-proxy or back-end service may not be utilized or available, subscribers may poll or wait and listen for publisher devices, e.g., at predetermined or otherwise set intervals, to obtain keys and/or provide confirmation that keys are received and ready for use. In some embodiments, edge devices may be able to confirm availability of keys at subscribers and/or back-end services.

In 4008, processor 4104 may be configured to encrypt at least one first data payload. In some examples disclosed herein, the at least one first data payload, once encrypted, requires the first cryptographic key for any subsequent decryption of the at least one first data payload. Various types of cryptographic keys, algorithms, and/or cryptosystems may be used, including with symmetric cryptographic keys, asymmetric cryptographic keys (key pairs), or any combination thereof, including embodiments in which any or all of multiple possible keys may be used to decrypt certain payloads, for example.

In 4010, processor 4104 may be configured to publish, via a data stream, the at least one first data payload as encrypted, according to some embodiments. Publishing may be performed using any communication protocol, which may, in some embodiments, be based on open source communication protocols, such as Message Queue Telemetry Transport (MQTT), Advanced Message Queuing Protocol (AMQP), or Apache Kafka, to name a few non-limiting examples. Publishing may be performed directly and/or via any of various data-broker platforms, including cloud service providers or other hosting services.

In 4012, processor 4104 may be configured to load a second cryptographic key, responsive to at least a first factor including an indication that a predetermined amount of time has elapsed. The predetermined time may be set by a configurable frequency parameter, according to some embodiments. The second cryptographic key may be loaded to replace the first cryptographic key, e.g., when encrypting data payloads of an edge device. In some embodiments using smart contracts, the second key may be associated with the smart contract in lieu of the first key, such as when different sets of subscribers are associated or re-associated with the smart contract, to allow for grant or revocation of access to certain sets of subscribers, for example.

The predetermined amount of time, or configured frequency, may be on any scale, and may be determined or otherwise set via any configuration means, such as via configuration parameters in a configuration file, command line, or application programming interface (API), for example. In some embodiments, such time/frequency parameters may be hard-coded for a given implementation of hardware, firmware, software, or any combination thereof.

In 4012, processor 4014 may repeat 4002, replacing the first cryptographic key with a second cryptographic key. In some embodiments, 4012 may iterate or reiterate 4002 as part of a software loop, for example, which may be run without a predetermined endpoint. As noted above with respect to 4002, similarly in 4012, the second cryptographic key may be loaded, for example, from an external device, which may, in some embodiments, include accelerated hardware tuned for enhanced cryptographic processing. Additionally, or alternatively, the external device may include at least one entropy source, which may not be present or readily usable on the same apparatus (e.g., edge device) as processor 4104. Such a use case may be referred to as a constrained-edge use case, such as that shown with respect to FIG. 36.

In some embodiments, the second cryptographic key may be loaded as generated on-board the same apparatus (e.g., edge device) as may include processor 4104. In such embodiments, at least one entropy source may be equipped on-board the same apparatus as processor 4104. Additionally, or alternatively, entropy may be sourced from an external device, in some embodiments. Entropy sources may be used to source (pseudo-)random number generators for use with cryptographic key generation. Entropy sources may include, but are not limited to, environmental sensors (different from or the same as any environmental sensors used to feed a data-stream payload for publishing), on-board signals, or any noise generated or detected by the same apparatus as may include processor 4104.

In 4014, processor 4104 may be configured to transmit the second cryptographic key to the back-end service. As noted above with respect to 4004, similarly in 4014, use of a back-end service may be optional. Thus, additionally, or alternatively, the second cryptographic key may be transmitted directly to one or more subscriber devices, whether or not any back-end service is present or available, according to some embodiments.

In 4016, processor 4104 may be configured to confirm that the second cryptographic key is ready for use. In other embodiments, where a key-proxy or back-end service may not be utilized or available, subscribers may poll publisher devices, e.g., at predetermined or otherwise set intervals, to obtain keys and/or provide confirmation that keys are received and ready for use. In some embodiments, edge devices may be able to confirm availability of keys at subscribers and/or back-end services.

In 4018, processor 4104 may be configured to encrypt at least one second data payload, In some embodiments, the at least one second data payload, once encrypted, requires the second cryptographic key for any subsequent decryption of the at least one second data payload, and wherein the first cryptographic key is ineffective to decrypt the at least one second data payload. Various types of cryptographic keys, algorithms, and/or cryptosystems may be used, including with symmetric cryptographic keys, asymmetric cryptographic keys (key pairs), or any combination thereof, including embodiments in which any or all of multiple possible keys may be used to decrypt certain payloads, for example, as similarly described above with respect to 4010.

In 4020, processor 4104 may be configured to publish, via the data stream, the at least one second data payload as encrypted, according to some embodiments. Publishing may be performed using any communication protocol, which may, in some embodiments, be based on open source communication protocols, such as Message Queue Telemetry Transport (MQTT), Advanced Message Queuing Protocol (AMQP), or Apache Kafka, to name a few non-limiting examples. Publishing may be performed directly and/or via any of various data-broker platforms, including cloud service providers or other hosting services, as described further herein above.

Various embodiments may be implemented, for example, using one or more computer systems, such as computer system 4100 shown in FIG. 41. One or more computer systems 4100 may be used, for example, to implement any of the embodiments discussed herein, as well as combinations and sub-combinations thereof.

Computer system 4100 may include one or more processors (also called central processing units, or CPUs), such as a processor 4104. Processor 4104 may be connected to a bus or communication infrastructure 4106.

Computer system 4100 may also include user input/output device(s) 4103, such as monitors, keyboards, pointing devices, etc., which may communicate with communication infrastructure 4106 through user input/output interface(s) 4102.

One or more of processors 4104 may be a graphics processing unit (GPU). In an embodiment, a GPU may be a processor that is a specialized electronic circuit designed to process mathematically intensive applications. With capabilities of general-purpose computing on graphics processing units (GPGPU), the GPU may be useful in various other applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Computer system 4100 may also include a main or primary memory 4108, such as random access memory (RAM). Main memory 4108 may include one or more levels of cache. Main memory 4108 may have stored therein control logic (i.e., computer software) and/or data.

Computer system 4100 may also include one or more secondary storage devices or memory 4110. Secondary memory 4110 may include, for example, a hard disk drive

4112 and/or a removable storage device or drive 4114. Removable storage drive 4114 may be a floppy disk drive, a magnetic tape drive, a compact disk drive, an optical storage device, tape backup device, and/or any other storage device/drive.

Removable storage drive 4114 may interact with a removable storage unit 4118. Removable storage unit 4118 may include a computer usable or readable storage device having stored thereon computer software (control logic) and/or data. Removable storage unit 4118 may be a floppy disk, magnetic tape, compact disk, DVD, optical storage disk, and/any other computer data storage device. Removable storage drive 4114 may read from and/or write to removable storage unit 4118.

Secondary memory 4110 may include other means, devices, components, instrumentalities or other approaches for allowing computer programs and/or other instructions and/or data to be accessed by computer system 4100. Such means, devices, components, instrumentalities or other approaches may include, for example, a removable storage unit 4122 and an interface 4120. Examples of the removable storage unit 4122 and the interface 4120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 4100 may further include a communication or network interface 4124. Communication interface 4124 may enable computer system 4100 to communicate and interact with any combination of external devices, external networks, external entities, etc. (individually and collectively referenced by reference number 4128). For example, communication interface 4124 may allow computer system 4100 to communicate with external or remote devices 4128 over communications path 4126, which may be wired and/or wireless (or a combination thereof), and which may include any combination of LANs, WANs, the Internet, etc. Control logic and/or data may be transmitted to and from computer system 4100 via communication path 4126.

Computer system 4100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 4100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 4100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 4100, main memory 4108, secondary memory 4110, and removable storage units 4118 and 4122, as well as tangible articles of manufacture embodying any combination of the foregoing. Such control logic, when executed by one or more data processing devices (such as computer system 4100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 41. In particular, embodiments may operate with software, hardware, and/or operating system implementations other than those described herein.

It is to be appreciated that the Detailed Description section, and not any other section, is intended to be used to interpret the claims. Other sections may set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

We claim:

1. A non-transitory computer-readable storage device having instructions stored thereon, wherein the instructions, when executed by at least one computer processor, cause the at least one computer processor to perform operations comprising: loading a first cryptographic key associated with a first subscriber who has been granted access to a data stream by a data owner, wherein access to the data steam is controlled by the data owner and wherein the first cryptographic key was received via a network channel separate from the data stream; encrypting at least one first data payload, wherein the at least one first data payload, once encrypted, requires the first cryptographic key for any subsequent decryption of the at least one first data payload; publishing, via the data stream, the at least one first data payload as encrypted; loading a second cryptographic key associated with a second who has been granted access to the data stream by the data owner, responsive to a determination that the first subscriber access has been revoked by the data owner, wherein the second subscriber differs from the first subscriber, and wherein the second cryptographic key was received via the separate network channel wherein loading the second cryptographic key further comprises publishing a message in the separate network channel, the message indicating that the second cryptographic key is going to be used; encrypting at least one second data payload, wherein the at least one second data payload, once encrypted, requires the second cryptographic key for any subsequent decryption of the at least one second data payload, and wherein the first cryptographic key is ineffective to decrypt the at least one second data payload; and publishing, via the data stream, the at least one second data payload as encrypted, wherein the first data payload and the second data payload comprise a first data point and a second data point, respectively, wherein the first data point and the second data point are collected from at least one sensor, and wherein the at least one sensor is communicatively coupled with the at least one computer processor.

2. The non-transitory computer-readable storage device of claim 1, the operations further comprising:
associating the data stream with a smart contract on a blockchain platform, and wherein the first data stream is tokenized via the smart contract.

3. The non-transitory computer-readable storage device of claim 2, wherein the blockchain platform is associated with a key-proxy service.

4. The non-transitory computer-readable storage device of claim 1, the operations further comprising transmitting a record in the data stream, wherein the record comprises a timestamp.

5. The non-transitory computer-readable storage device of claim 1, the operations further comprising:
associating the first cryptographic key with a first index value;
associating the second cryptographic key with a second index value; and
transmitting, with the second cryptographic key, the second index value to a back-end service comprising a key-proxy service.

6. The non-transitory computer-readable storage device of claim 1, wherein either of the first cryptographic key or the second cryptographic key were generated using at least one entropy source.

7. The non-transitory computer-readable storage device of claim 1, the operations further comprising transmitting, to a back-end service comprising a key-proxy service, information to interface with a data-volume rating system.

8. The non-transitory computer-readable storage device of claim 7, wherein the information comprises a quantity of bytes that have been encrypted using the first cryptographic key, the second encrypted key, or a combination thereof.

9. The non-transitory computer-readable storage device of claim 1, further comprising waiting a predetermined amount of time between publishing the message and using the second cryptographic key.

10. The non-transitory computer-readable storage device of claim 1, wherein loading the second cryptographic key further comprises determining the second cryptographic key is ready to be used by at least one of communicating with a key-proxy service, checking a smart contract, or querying a database.

11. An apparatus for publishing an encrypted data stream, the apparatus comprising: at least one memory device configured to store computer-executable instructions; and at least one computer processor communicatively coupled with the at least one memory, the at least one computer processor capable of being configured, via at least the computer-executable instructions, to perform operations comprising: receiving, from a source external to the apparatus, a first cryptographic key associated with a first subscriber who has been granted access to a data stream by a data owner, wherein access to the data steam is controlled by the data owner and wherein the first cryptographic key was received at the apparatus via a network channel separate from the data stream; encrypting at least one first data payload, wherein the at least one first data payload, once encrypted, requires the first cryptographic key for any subsequent decryption of the at least one first data payload; publishing, via the data stream, the at least one first data payload as encrypted; receiving, from the source external to the apparatus, a second cryptographic key associated with a second subscriber who has been granted access to the data stream by the data owner, responsive to a determination that the first subscriber access has been revoked by the data owner, wherein the second subscriber differs from the first subscriber, and wherein the second cryptographic key was received at the apparatus via the separate network wherein to load the second cryptographic key the operations further comprise publishing a message in the separate network channel, the message indicating that the second cryptographic key is going to be used; encrypting at least one second data payload, wherein the at least one second data payload, once encrypted, requires the second cryptographic key for any subsequent decryption of the at least one second data payload, and wherein the first cryptographic key is ineffective to decrypt the at least one second data payload; and publishing, via the data stream, the at least one second data payload as encrypted, wherein the first data payload and the second data payload comprise a first data point and a second data point, respectively, wherein the first data point and the second data point are collected from at least one sensor, and wherein the at least one sensor is communicatively coupled with the at least one computer processor.

12. The apparatus of claim 11, the operations further comprising transmitting a record in the data stream, wherein the record comprises a timestamp.

13. The apparatus of claim 11, the operations further comprising transmitting, to a back-end service comprising a key-proxy service, information to interface with a data-volume rating system.

14. The apparatus of claim 13, wherein the information comprises a quantity of bytes that have been encrypted using the first cryptographic key, the second encrypted key, or a combination thereof.

15. The apparatus of claim 11, the operations further comprising:
associating the first cryptographic key with a first index value;
associating the second cryptographic key with a second index value; and
transmitting, with the second cryptographic key, the second index value to a back-end service comprising a key-proxy service.

16. The apparatus of claim 11, wherein either of the first cryptographic key or the second cryptographic key were generated using at least one entropy source.

17. The apparatus of claim 11, wherein the operations further comprise waiting a predetermined amount of time between publishing the message and using the second cryptographic key.

18. The apparatus of claim 11, wherein to load the second cryptographic key the operations further comprise determining the second cryptographic key is ready to be used by at least one of: communicating with a key-proxy service, checking a smart contract, or querying a database.

* * * * *